(12) United States Patent
Masten, Jr.

(10) Patent No.: US 11,623,888 B2
(45) Date of Patent: Apr. 11, 2023

(54) PROCESS FOR PREPARING GLASS LAMINATE

(71) Applicant: James William Masten, Jr., Everett, WA (US)

(72) Inventor: James William Masten, Jr., Everett, WA (US)

( * ) Notice: Subject to any disclaimer, the term of this patent is extended or adjusted under 35 U.S.C. 154(b) by 0 days.

(21) Appl. No.: 17/932,261

(22) Filed: Sep. 14, 2022

(65) Prior Publication Data

US 2023/0066471 A1   Mar. 2, 2023
US 2023/0066471 A1   Mar. 2, 2023

Related U.S. Application Data

(63) Continuation of application No. 17/407,098, filed on Aug. 19, 2021.

(51) Int. Cl.
| | |
|---|---|
| *C03B 27/012* | (2006.01) |
| *C03B 27/004* | (2006.01) |
| *C03C 27/10* | (2006.01) |
| *B32B 17/10* | (2006.01) |

(52) U.S. Cl.
CPC ...... *C03B 27/012* (2013.01); *B32B 17/10816* (2013.01); *B32B 17/10871* (2013.01); *B32B 17/10972* (2013.01); *C03B 27/004* (2013.01); *C03C 27/10* (2013.01)

(58) Field of Classification Search
CPC ........ B32B 17/10816; B32B 17/10871; B32B 17/10972
See application file for complete search history.

(56) References Cited

U.S. PATENT DOCUMENTS

| | | | |
|---|---|---|---|
| 4,172,921 A * | 10/1979 | Kiefer | .................. C03B 27/012 428/920 |
| 5,779,755 A | 7/1998 | Kuster et al. | |
| 6,717,112 B1 * | 4/2004 | Probst | ................. H01L 31/0749 118/724 |
| 6,983,104 B2 | 1/2006 | Longobardo et al. | |
| 7,082,260 B2 | 7/2006 | Longobardo et al. | |
| 9,010,153 B2 | 4/2015 | Ukrainczyk et al. | |
| 10,538,451 B2 | 1/2020 | Angel et al. | |
| 10,682,585 B2 | 6/2020 | Masten, Jr. | |
| 10,717,933 B2 | 7/2020 | Masten, Jr. | |
| 10,718,527 B2 | 7/2020 | Masten, Jr. | |
| 11,045,755 B2 | 6/2021 | Masten, Jr. | |

FOREIGN PATENT DOCUMENTS

WO    WO-0138241 A1 *   5/2001   ............. C03B 27/00

* cited by examiner

*Primary Examiner* — Barbara J Musser

(57) ABSTRACT

A glass laminate is produced using infrared emitters to deliver thermal energy to an unbonded glass laminate assembly. Heat may be conducted to the glass laminate by at least one ceramic glass substrate that absorbs at least a portion of the infrared radiation from the emitters, thereby bonding the glass laminate assembly more quickly and efficiently than a conventional vacuum bag process.

15 Claims, 14 Drawing Sheets

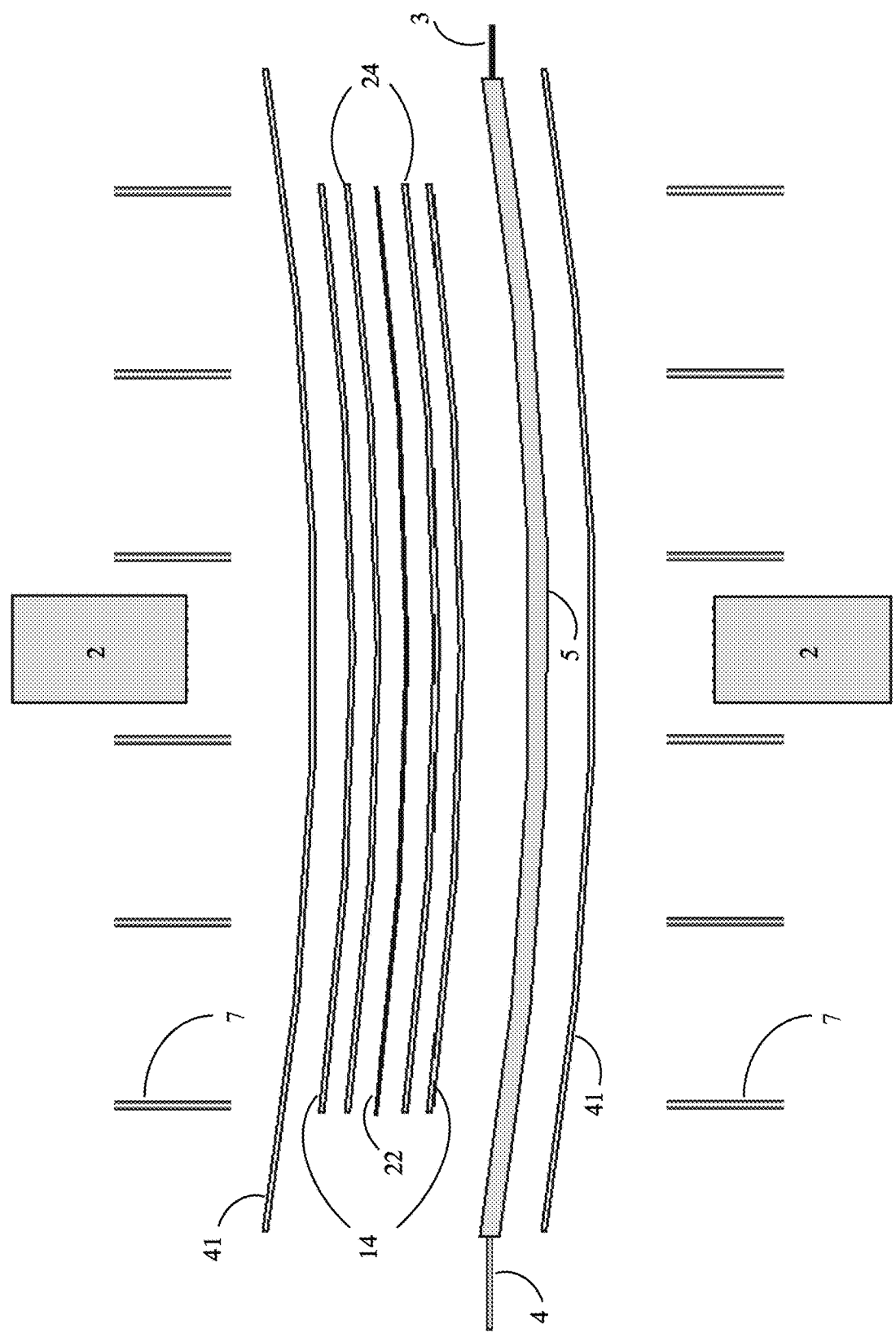

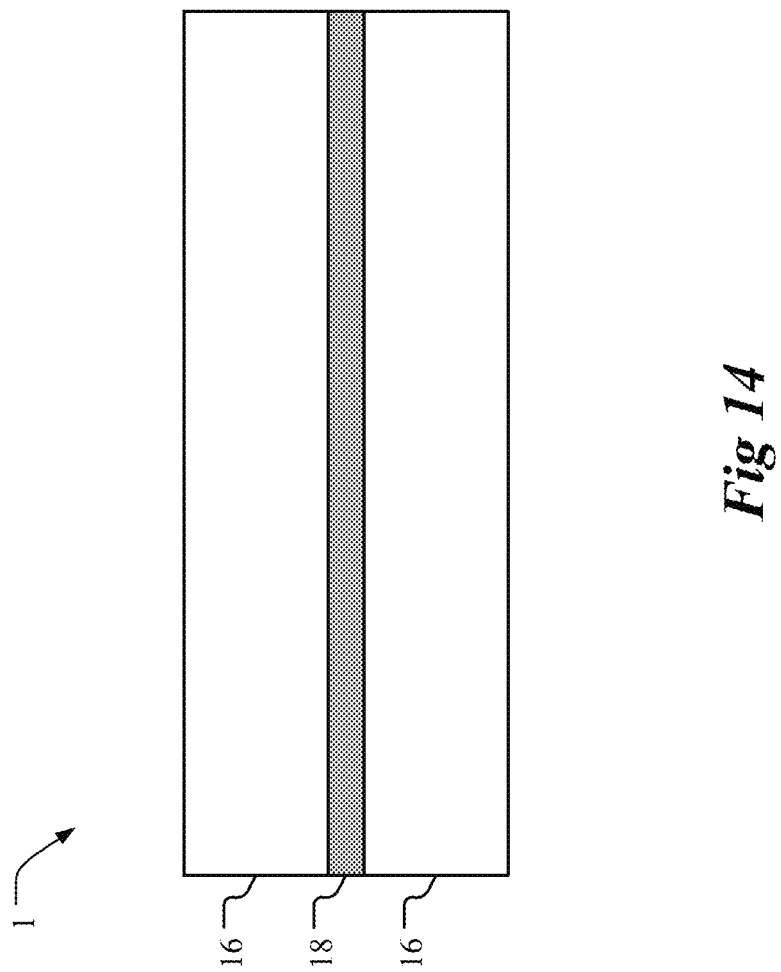

PROCESS FOR PREPARING GLASS LAMINATE

CROSS-REFERENCE TO RELATED APPLICATION

This application is a continuation of and claims priority to U.S. patent application Ser. No. 17/407,098, filed Aug. 19, 2021, the contents of which are incorporated herein in their entirety.

BACKGROUND

For more than 100 years the process of tempering glass has been evolving from a uniform heating with hot air or a more inert gas to a combination of hot gas and radiant heating and then a quenching process by emersion in a cool medium. The process is known to produce better results when each process is uniform over all surfaces of the glass and when the quenching process is very quick: faster is better.

After the development of float glass, where simple soda or soda-lime glass is poured as a liquid onto a pool of molten tin to allow the glass to begin cooling and form a near perfectly flat bottom and a near perfectly parallel top, the tempering of glass enabled the safe use of glass as an architectural component and not just a light vent or a view port. The enhanced clarity and reduced distortion of float glass made applications even more popular.

Tempering involves heating the glass to the onset of liquefaction and then rapidly quenching the glass to encourage the outer layer of the glass to shrink and be in tension over the interior of the glass.

Bending glass involves heating the glass to just beyond the onset of liquefaction and then allowing the glass to be reshaped by the forces of gravity alone, or shaped to a mold using gravity and/or differential gas pressure or by mechanical pressure using rollers operating over a variable radius.

Because of the inefficiencies of moving gas and the low thermal capacity of most gases, which means a lot of gas must be moved, the overall process speed is limited. As a result, most industrial thermo-physical processes which treat glass have become long serial process lines with very large thermal capacities in their own right. These long serial process lines require long warm-up and cool-down cycles which are measured in days, complicate maintenance issues and further limit the final production rate of the process.

Current challenges to the high-volume glass tempering and bending processes are uneven heating between the top and the bottom surfaces and the edges or different regions of the glass, the speed of the process and the expense caused by the inefficiencies of the heating process. Additionally, the most common handling process currently in practice involves moving the glass through the oven system by mechanical rollers composed of steel or ceramic. The steel rollers have a low emissivity as compared to the product glass and do not get as hot as the product glass from the radiant energy. The steel rollers tend to cool the product glass and the product glass tends to stick to the steel. But the ceramic rollers typically have a higher emissivity than the product glass, so the radiant energy inside the oven system makes the ceramic rollers get hotter than the product glass from the same exposure inside the oven. The hot rollers cause isolated regions of heating in the product glass. To resolve this uneven heating caused by the physical presence of the rollers, the glass is constantly moved forward and then backward in an attempt to even out the cooling, heating and sticking. But this reciprocal motion only evens out and ultimately adds to the heating on the bottom surface of the product glass. The top surface of the glass does not get the same benefits, so there are heating issues related to the use of current product glass-heating technologies.

Instead, the top surface benefits somewhat from the fact that attempts are made to put the top of the glass from the tin float process up towards the radiant heating systems on the roof of the oven. The top surface of the glass is known to have a significantly higher emissivity than the bottom of the float glass as a result of the defect-free top surface of the float glass as contrasted to the bottom of the float glass that was against the tin during the float cooling process.

Furthermore, the common radiant emitters that are used to heat the furnace are either gas or conventional electric emitters and as such do not have optimum heating characteristics. Conventional electric elements have a range of maximum heating temperatures from about 800° F. to about 1,100° F., but because of the physical construction of the radiant elements, the projection of the radiant energy is highly uneven. The gas-fired radiant elements are challenged because gas combustion has a natural convection characteristic and getting the radiant pattern to point down is very problematic. As a result, current technology furnaces use pumped or blown hot air to balance or even out the surface heating of both the top and the bottom of the product glass in process. But using hot gases is problematic because of the extremely low density of gases at these operating temperatures, the volumes of gas that must be pumped, the energy consumed and the physical construction necessary to manage such volumes without extreme thermal losses.

BRIEF SUMMARY

The present disclosure describes an apparatus and method for heating a product glass, and more specifically, for preparing a glass laminate.

A method for preparing a glass laminate includes bringing a first side of an unbonded glass laminate into contact with a first ceramic glass substrate, the unbonded glass laminate including at least one material layer disposed between two sheets of glass, applying a seal to the unbonded glass laminate to create a sealed area, drawing a vacuum within the sealed area, irradiating the first ceramic glass substrate with infrared energy by a first infrared emitter to bond the glass laminate, releasing the vacuum, and separating the bonded glass laminate from the first ceramic glass substrate.

The method may include bringing a second side of the unbonded glass laminate into contact with a second ceramic glass substrate before applying the seal. The seal may be an elastomeric seal that extends around a perimeter of the first and second substrates. The second substrate may be a ceramic glass substrate, and the method include irradiating the second ceramic glass substrate with infrared energy by a second infrared emitter.

In an embodiment, more than 80% of infrared energy emitted by the first and second emitters is absorbed by the first and second ceramic glass substrates. The vacuum may be drawn through a vacuum port disposed in the elastomeric seal. The sealed area may be bounded by the first and second ceramic glass substrates and an elastomeric seal that extends around a perimeter of the first and second ceramic glass substrates.

In an embodiment, the irradiating heats the first ceramic glass substrate to a temperature that is higher than a temperature of the sheet of glass contacting the first substrate. The at least one material layer may include a polymeric material layer disposed between two adhesive layers. The at least one material layer may include at least one of a tinted polymeric layer and an electrochromic layer. Irradiating the first ceramic glass substrate may heat the uncured glass laminate to a temperature of 450° F. or less.

In an embodiment, bringing the first side of the unbonded glass laminate into contact with the first ceramic glass substrate includes grasping a frame coupled to the first ceramic glass substrate and lowering the first ceramic glass substrate by the frame onto the unbonded glass laminate. A force may be applied to compress the glass laminate when the glass laminate is being bonded.

In another embodiment, a method for heating a sheet of glass includes bringing a first side of the sheet of glass into contact with a first substrate, bringing a second side of the sheet of glass into contact with a second substrate, and irradiating the first substrate with infrared energy by a first infrared emitter, wherein the first substrate is heated to a temperature that is higher than a temperature of the sheet of glass. More than 50% of infrared energy from the first infrared emitter may be absorbed by the first substrate.

The method may further include irradiating the second substrate with infrared energy by a second infrared emitter disposed on an opposite side of the sheet of glass from the first infrared emitter, and more than 80% of infrared energy emitted by the first and second emitters may be absorbed by the first and second substrates. In an embodiment, the first side is an upper side and the second side is a lower side with respect to an orientation of the sheet of glass.

The first substrate may be heated to the temperature which is from 20 to 600° F. higher than the temperature of the sheet of glass. The first substrate may include a sheet of ceramic material that covers an entire surface of the first side of the sheet of glass, and the sheet of glass may be soda lime glass. The sheet of glass may be heated to a temperature of at least 1,100° F., and the sheet of glass may be tempered or bent after being heated.

In an embodiment, the method includes, after heating the first substrate, cooling the first substrate by a stream of gas directed at the first substrate. At least 50% of energy that heats the sheet of glass may be transferred to the sheet of glass from the first and second substrates. In an embodiment, at least 75% of energy that heats the sheet of glass is transferred to the sheet of glass from the first and second substrates.

The method may further include cooling the sheet of glass by exposing the first and second substrates to a stream of fluid comprising at least one of a gas and a liquid. In an embodiment, a peak output of the first infrared emitter is within a range of from 1,000 to 2,500 nm.

In an embodiment, a method for heating a sheet of glass includes irradiating a first substrate with infrared energy output from a first infrared emitter, conductively transferring heat from the first substrate to a first surface of the sheet of glass, irradiating a second substrate with infrared energy output from a second infrared emitter, and conductively transferring heat from the second substrate to a second surface of the sheet of glass, wherein the first substrate is in direct physical contact with the first surface of the sheet of glass, and the second substrate is in direct physical contact with the second surface of the sheet of glass.

In an embodiment, a heat treatment assembly includes a first substrate, a second substrate, and a plurality of infrared heating elements. The infrared heating elements may include a first emitter disposed on a first side of the first substrate and a second emitter disposed on a second side of the second substrate when a sheet of glass is disposed between the substrates. In an embodiment, the first side is an upper side of the assembly, and the second side is a lower side of the assembly. In another embodiment, the substrates are vertically oriented, and the sides are left and right sides.

One or both of the first and second substrates may comprise a ceramic glass material. Each substrate may be a solid sheet of homogenous ceramic glass material, or a sheet of ceramic glass that is coated with one or more coating layer. The coating layer may be one or more of a lubricious material, a heat transfer material, and IR absorptive material. In an embodiment, a substrate comprises a composite structure that includes a first material disposed between two sheets of a second material that is a ceramic material. One or both of the first and second substrates may be configured to completely cover one surface of a sheet of product glass. One or both of the first and second substrates may have a surface area that is 0.25 square meters or more or 1.0 square meters or more.

In an embodiment, the ceramic glass material is a material that absorbs energy in the infrared spectrum. The ceramic glass material may absorb 80%, 90% or more of a portion of a range of wavelengths from 700 to 4500 nm. The ceramic glass material may absorb more than 95% of infrared energy in at least one wavelength that is between 2750 and 3100 nm. In an embodiment, the ceramic glass material does not transmit more than 75% of any frequency from 700 nm to 5000 nm. The ceramic glass may be an opaque material. The ceramic glass may transmit less than 50% of wavelengths from 700 to 1500 nm. The ceramic material may have a useful transmission range that extends to at least 2,000° F., 2,250° F., or 2,500° F. or higher and retain useful physical properties at an operating temperature of 1,740° F. or higher.

In some embodiments, especially when the configuration has minimal mechanical implications, the ceramic material may be used at the transmission ranges disclosed above. For example, when a ceramic material is being used primarily as an absorber of IR energy and a conductive heat source, the ceramic material may be used at temperatures at which it retains only a portion of the mechanical properties it has at room temperature.

The heat treatment assembly may further comprise supports which are configured to engage with edges of a sheet of glass. In an embodiment, the edges of the glass sheet are formed to have a shape that is a mirror image of a shape of the supports, so that the supports can engage with the sheet of glass in at least two dimensions. In an embodiment, the edges of the glass are shaped to have a depression that interfaces with a protrusion of a support, or vice versa. The supports may be a ceramic material. The supports may have one or more orifice that is coupled to an external structure that holds the supports in position.

The infrared heating elements may be tunable infrared heating elements that can be tuned to have a peak output of from about 1000 nm to 3500 nm. The heat treatment assembly may include from two to twenty IR emitters on each side of a sheet of glass, for example.

The heat treatment assembly may include one or more nozzle that is adapted to evenly deliver a fluid such as a gas, a liquid, or both to the product glass or the ceramic substrate. In an embodiment, one or more nozzle is configured to deliver a gas to cool a ceramic substrate to a first temperature, and one or more nozzle is configured to deliver a liquid to cool the ceramic substrate after the ceramic substrate reaches the first temperature. The first temperature may be from 200° F. to 1,200° F., from 300° F. to 1,000° F., or from 500° F. to 1,000° F., from 800° F. to 1,100° F., from 300° F.

to 800° F., from 800° F. to 1,100° F. or from 1000° F. to 1,200° F., and the liquid may be delivered as a spray or a mist.

In an embodiment, the heat treatment assembly includes a support structure. The support structure may comprise a lower part that includes a refractory material, and an upper substrate that is a metal or ceramic material. The upper substrate may be a metal such as a steel that is coated with a material that prevents adhesion to glass at elevated temperatures. For example, the upper layer may include a nitride material such as boron nitride or titanium nitride. The upper surface of the support structure may have contours in two or three dimensions, and may be configured to shape a sheet of heated glass to conform to the contours. The support structure may further comprise infrared heating elements, fluid channels, and/or one or more fluid jet configured to deliver a gas or liquid to the substrate or the glass.

A heat treatment assembly may include a sealing element that is configured to create a seal between an upper substrate and a lower substrate. One or more vacuum port may be disposed in the sealing element, and the sealing element may be an elastomeric material such as silicon. The heat treatment assembly may further comprise a clamp or press that is configured to press the first substrate against the second substrate.

Embodiments of the present application include a process for laminating a glass material. A process for laminating a glass material may include one or more of placing a polymeric film between a first sheet of glass and a second sheet of glass, placing the first sheet of glass against a first substrate, placing a second substrate against the second sheet of glass, creating a sealed enclosure between the first substrate and the second substrate, evacuating the sealed enclosure, and heating the upper and lower substrates. Creating a seal may include providing a seal around edges of the first and second substrates to create a sealed enclosure, and evacuating air from the sealed enclosure to create a vacuum within the sealed enclosure, wherein the sheet of glass is heated while maintaining the vacuum resulting in atmospheric or chamber pressure to squeeze trapped air or gases from between the glass sheets and press the sheets together during the heating process.

In an embodiment, the substrates are ceramic materials that are heated by infrared emitters. The substrates may be heated to a temperature above a reaction temperature for the polymeric film.

The polymeric film may include one or more layer of adhesive material, which may be a cross-linking binding material. The substrates may be heated to a temperature that is higher than a temperature of the glass, and may transfer at least a portion of their heat to the glass laminate by conduction. The substrates may be curved in at least one dimension. Mechanical or gas pressure may be applied to a substrate to press the laminate materials together. The laminated glass material may be cooled by cooling at least one substrate using a gas or liquid, wherein heat is transferred from the laminate to the substrate to the gas or liquid and removed by a flow of the gas or liquid.

BRIEF DESCRIPTION OF THE DRAWINGS

The accompanying drawings are intended to convey concepts of the present disclosure and are not intended as blueprints for construction, as they are not necessarily drawn to scale: the drawings may be exaggerated to express aspects of unique detail. However, the foregoing aspects and many of the attendant advantages of embodiments of this disclosure will become more readily appreciated by reference to the following detailed descriptions, when taken in conjunction with the accompanying drawings, wherein:

FIG. 6 shows an exploded side view of the components shown in FIG. 5.

FIG. 14 illustrates an embodiment of a composite substrate material.

DETAILED DESCRIPTION

Figure 1:
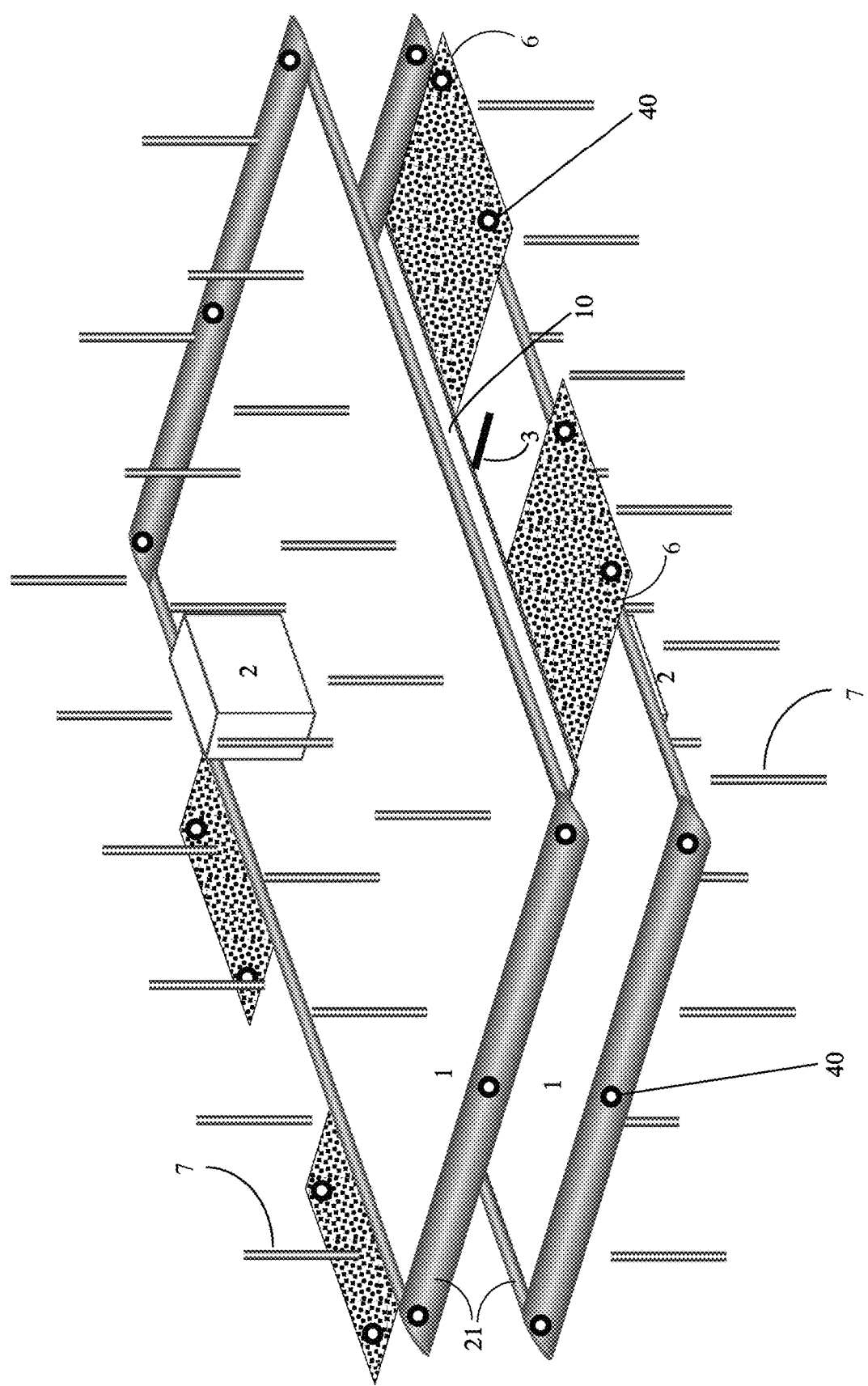
FIG. 1 shows an exploded orthogonal view of an embodiment of a system including infrared emitters, top and bottom ceramic glass thermal energy transfer mediums and the product glass.

The following list provides specific descriptions and examples of items that are present in the embodiments illustrated by the figures. The descriptions in the list are illustrative of specific embodiments, and should not be construed as limiting the scope of this disclosure.

REFERENCE

Numerals Description
1 Infrared-absorptive ceramic glass substrate
2 Infrared radiant emitter
3 Temperature sensor
4 Vacuum port
5 Vacuum seal
6 Product glass support
7 Cooling jets
8 Infrared energy emissions from the emitter 2
9 Infrared energy emissions after having passed through at least one semi-transparent ceramic substrate 1

10 Sheet of product glass
11 Infrared energy driven back towards its source by the high temperature of the closer emitter
12 Sheet of tempered product glass
14 Curved sheet of product glass
16 Ceramic glass material
18 Additional material layer
21 Frame to support substrate 1
22 Polymer film
24 Cross-linking binder
31 Glass laminate
32 Detail of layers of glass laminate 31
33 Sheet of formed (bent) product glass
36 Interface between product glass 10 and product glass support 6
37 Mold substrate
38 Support structure of machined, insulating refractory bricks
39 Coating layer, e.g. a nitride, carbide or oxide of Boron or a metal or semiconductor material
40 Positioning system mounting hole
41 Bandwidth-limited Infrared-transmissive ceramic curved glass sheet
81 Identifies the upper and highly transmissive passband for an example second generation non-tinted translucent Ceramic Glass at a selected wavelength
82 Output curve for infrared heater tuned to peak of about 3250 nm
91 Output curve for infrared heater tuned to peak of about 1500 nm
92 Output curve for infrared heater tuned to peak of about 3250 nm
93 Output curve for infrared heater tuned to peak of about 1500 nm
101 Identifies the upper UV range of electromagnetic transmission of soda-lime-silica glass
102 Identifies the lower infrared range of electromagnetic transmission of soda-lime-silica glass
111 Identifies the angle from normal for which more than 90% of the incident electromagnetic energy is transmitted through or absorbed by soda-lime-silica glass material
112 Identifies the angle from normal for which more than 50% of the incident electromagnetic energy is transmitted through or absorbed by soda-lime-silica glass material Embodiments of the present application describe a glass heating system and method that incorporate a tunable, infrared emitter 2 and the use of IR absorptive ceramic glass 1. The ceramic glass 1 may have a very low coefficient of thermal expansion (CTE) such as $0.6 \times 10^{-6}$ ppm/° C. or less at room temperature, less than $1.0 \times 10^{-6}$ ppm/° C. at room temperature, and less than $2.0 \times 10^{-6}$ ppm/° C. within the temperature range of 300-700° C. In some embodiments, the ceramic glass 1 has a CTE of $0.1 \times 10^{-6}$ ppm/° C. or a negative CTE at room temperature. Examples of ceramic glass 1 are commercially available through ceramic manufacturers such as SCHOTT™ and COORSTEK™. The infrared emitter 2 may be an infrared emitter such as the emitters described in U.S. patent application Ser. No. 17/347,428, which is incorporated herein by reference.

Infrared thermal energy of an infrared emitter 2 may be tuned to wavelengths that will have specific and significant transmissive efficacies inside the ceramic glass 1. The result is a system including a tunable infrared emitter 2 that heats the ceramic glass 1 nearly uniformly throughout its depth because of the transmissive characteristics of the ceramic glass 1 and their variability subject to wavelength. Such a heating system is not dependent on the thermal conductivity of the ceramic glass to quickly and evenly heat the ceramic glass. Instead, the distribution of radiant energy throughout the depth of the ceramic glass heats all depths simultaneously.

Even though radiant heat sources are used by conventional processes, a substantial portion of the heat transferred to the product glass is by convective transfer from gasses in a conventional furnace, which delays heat transfer to the product glass sheet. In contrast, embodiments of the present disclosure transfer higher amounts of heat to the ceramic glass 1 primarily by radiant transfer with minimal convective transfer, so a sheet of product glass is heated faster and more evenly by conductive transfer from the contact with the ceramic glass than a conventional heating process. Accordingly, embodiments of the present disclosure are less affected by the low thermal conductivity of the ceramic glass 1 and allow it to heat up very quickly because, unlike other mediums, the inside depth of the glass is heated at nearly the same rate as the surface of the ceramic glass.

The result is that the large surface area of a ceramic glass layer 1 in contact with the product glass 10 can function as a very uniform conductive heating source. Applying ceramic glass layers 1 to both surfaces of a sheet of product glass 10 enables a relatively short and controllable heating cycle for the product glass. Additionally, the low coefficient of expansion embodiments of the ceramic glass 1 makes the glass highly resistant to thermal shock and allows close fitment to form a tightly integrated surface of multiple components. For example, a ceramic glass 1 may be able to withstand direct exposure to room temperature water at a temperature of up to 1,508° F. without cracking. Thus the ceramic glass 1 is highly effective for uniformly both heating and cooling the product glass 10 throughout the tempering process.

Types and sizes of product glass that may be heat treated by processes of the present disclosure are not particularly limited, and include silica-based glass, soda-lime glass and float glass. The processes and systems described by the present disclosure may be applied to transfer heat to many different materials, and have broad industrial utility when applied to translucent and transparent silica-based glass. However, the processes and systems could be used to rapidly and evenly heat subject materials other than translucent or transparent silicon glass—for example, the processes and systems could be used to heat other glasses, ceramic materials, polymer materials or even metal materials.

In specific embodiments, embodiments of the present disclosure are used to heat treat architectural glass, automotive glass, and residential window glass. In some embodiments, the surface area of one side of the product glass 10 may be from about 0.1 square meters to 10 or more square meters. In particular, the surface area of a face of the product glass 10 may be 0.1, 0.25, 0.5, 1.0, 2.0, 5.0, or 10 square meters or larger. The product glass 10 may be a rigid and inelastic glass material. The product glass 10 may have a thickness of from 1 to 20 mm. In embodiments, the glass may have a thickness of 1 mm, 2 mm, 5 mm, 10 mm, 20 mm or greater. The product glass 10 may be a solid uninterrupted sheet of glass, or may have one or more hole formed therein.

When heating product glass 10 according to an embodiment of the present disclosure, the glass tempering threshold of 1,148° F. can be reached in a few minutes when starting with a room temperature apparatus and heating the tunable emitter 2 to a temperature that is at or near its maximum source temperature, which may be in excess of 2,250° F. Since virtually no warm-up cycle is required, an embodiment of the present disclosure enables the production of small batch cycles of product glass 10 to tempering and bending processes and significantly reduces the cost of high volume operations. The control capability of an electric infrared-emitter and ceramic glass system (IE&CG system) of the present disclosure enables the ability to heat product glass 10 to and beyond the bending threshold temperature of 1,166° F.

In an embodiment, the ceramic glass has a working temperature limit of 1,742° F., which provides a thermal margin which allows for enhanced heating cycles to make use of a large source to target heating difference for rapid thermal energy transfer. The ceramic glass 1 may have a non-reactive, smooth, pore-free surface which minimizes the risk of inducing an imperfection in the surface of the product glass 10 that could require corrective polishing for some applications. The ceramic glass material's low coefficient of expansion allows it to become a component of the cooling cycle as part of the tempering and/or bending processes. As the ceramic glass 1 is cooled, causing the cooling of the product glass 10, the product glass shrinks away from the ceramic glass as a free product.

In an embodiment, the contact surface of ceramic glass 1 is coated with a material such as boron nitride or titanium nitride, which can enhance the thermal transfer and reduce the possibility of bonding the ceramic glass 1 to the product glass 10. The ceramic glass 1 may be coated with a surface material 39 as a permanent coating, or the coating materials may be applied in a powder or fluid form that is periodically refreshed. The coating material may include a nitride, carbide or oxide of a metal or semiconductor material. When the surface material 39 is a powder coating, the powder may be, for example, a lubricating powder such as silica, magnesium oxide, cerite or sodium hydrogen carbonate.

Air passageways 7, which may be jets or nozzles that deliver a non-oxidizing gas may accelerate cooling by removing thermal energy from the ceramic glass 1, thereby providing a uniform cooling medium against the product glass 10.

Figure 2:
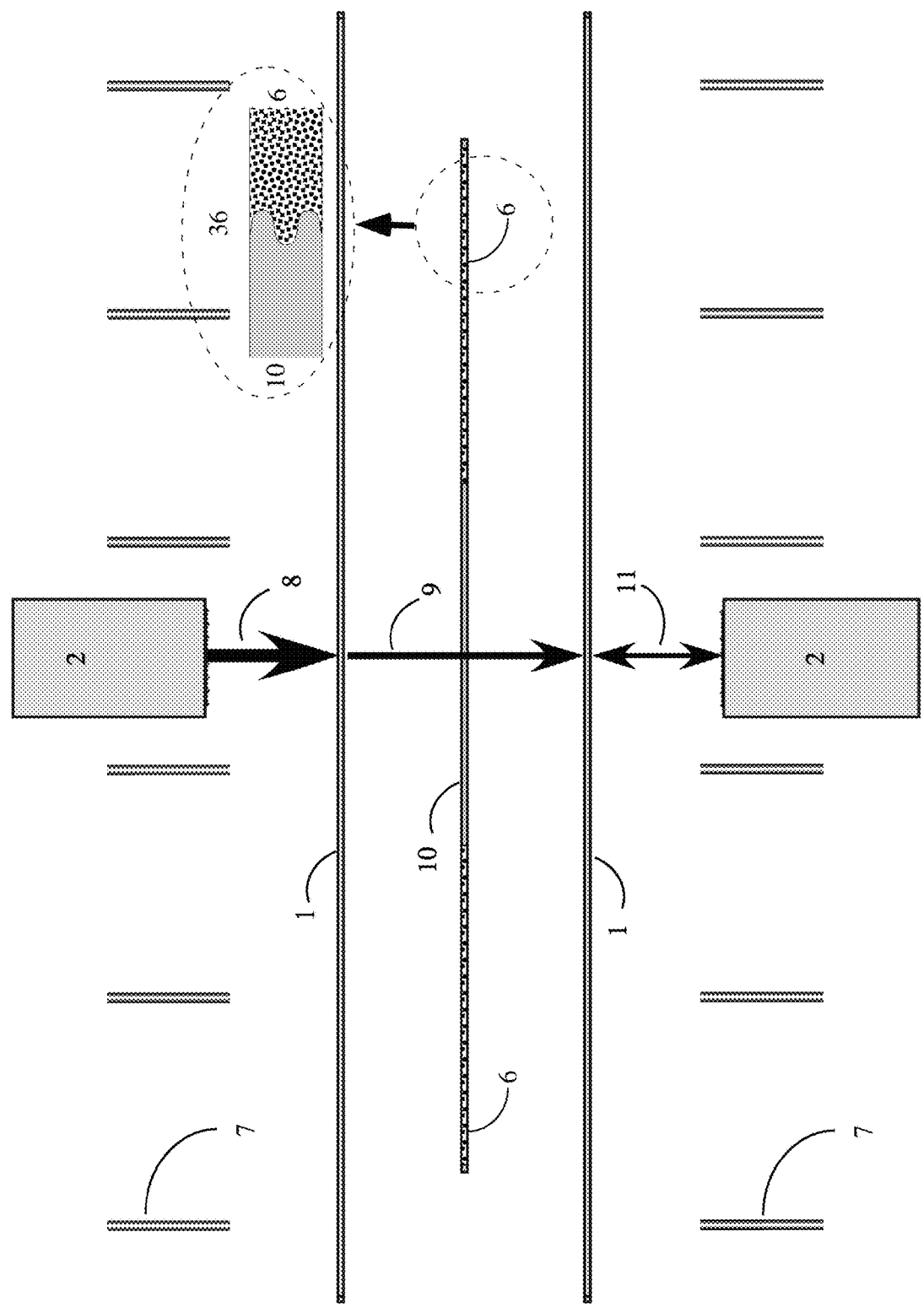
FIG. 2 shows an exploded side view of the embodiment shown in FIG. 1.
Figure 3:
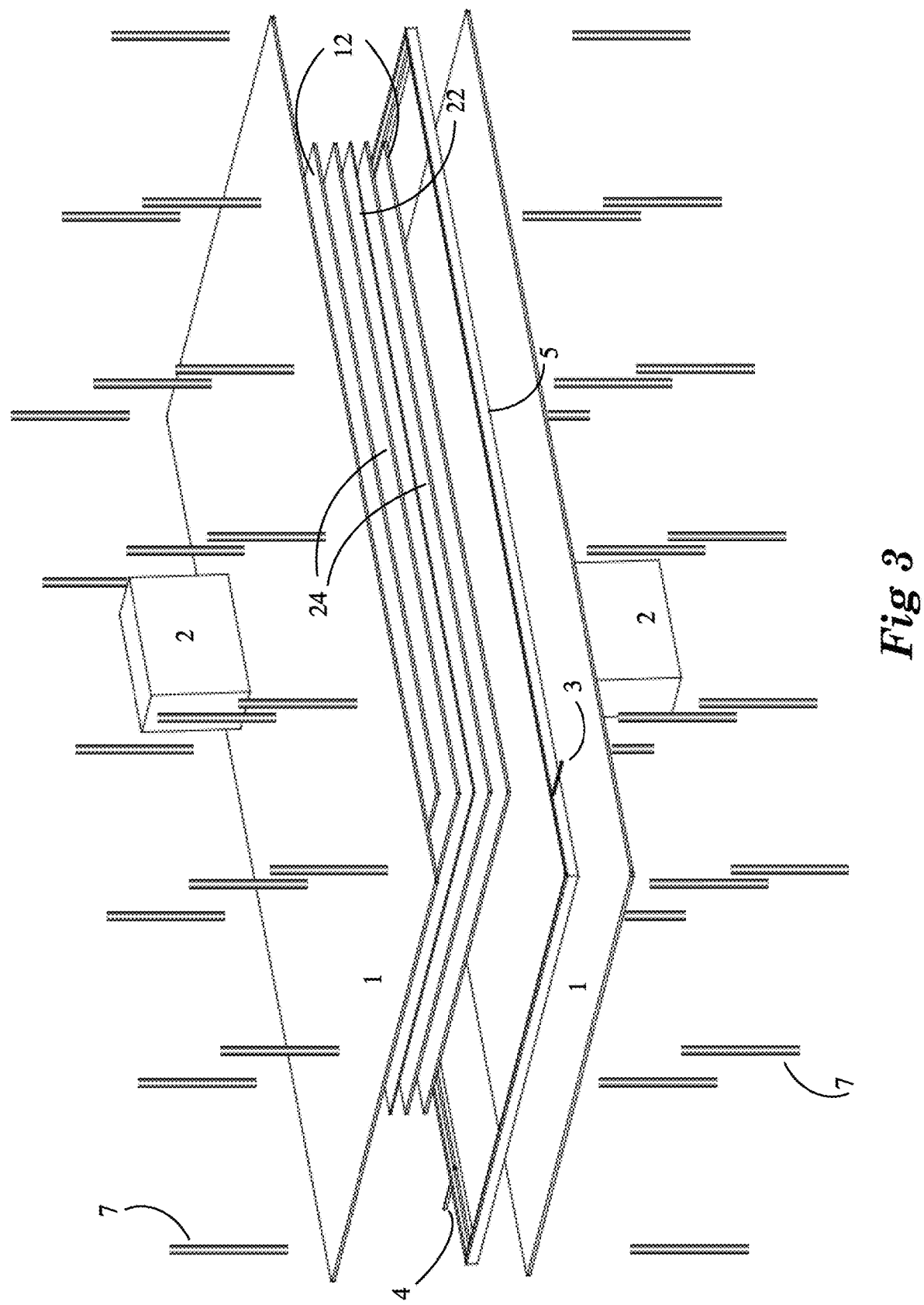
FIG. 3 shows an exploded view of an embodiment of components and an apparatus used to assemble a laminated glass composite with a film such as electrochromic or tinted polymer film at the center.
Figure 4:
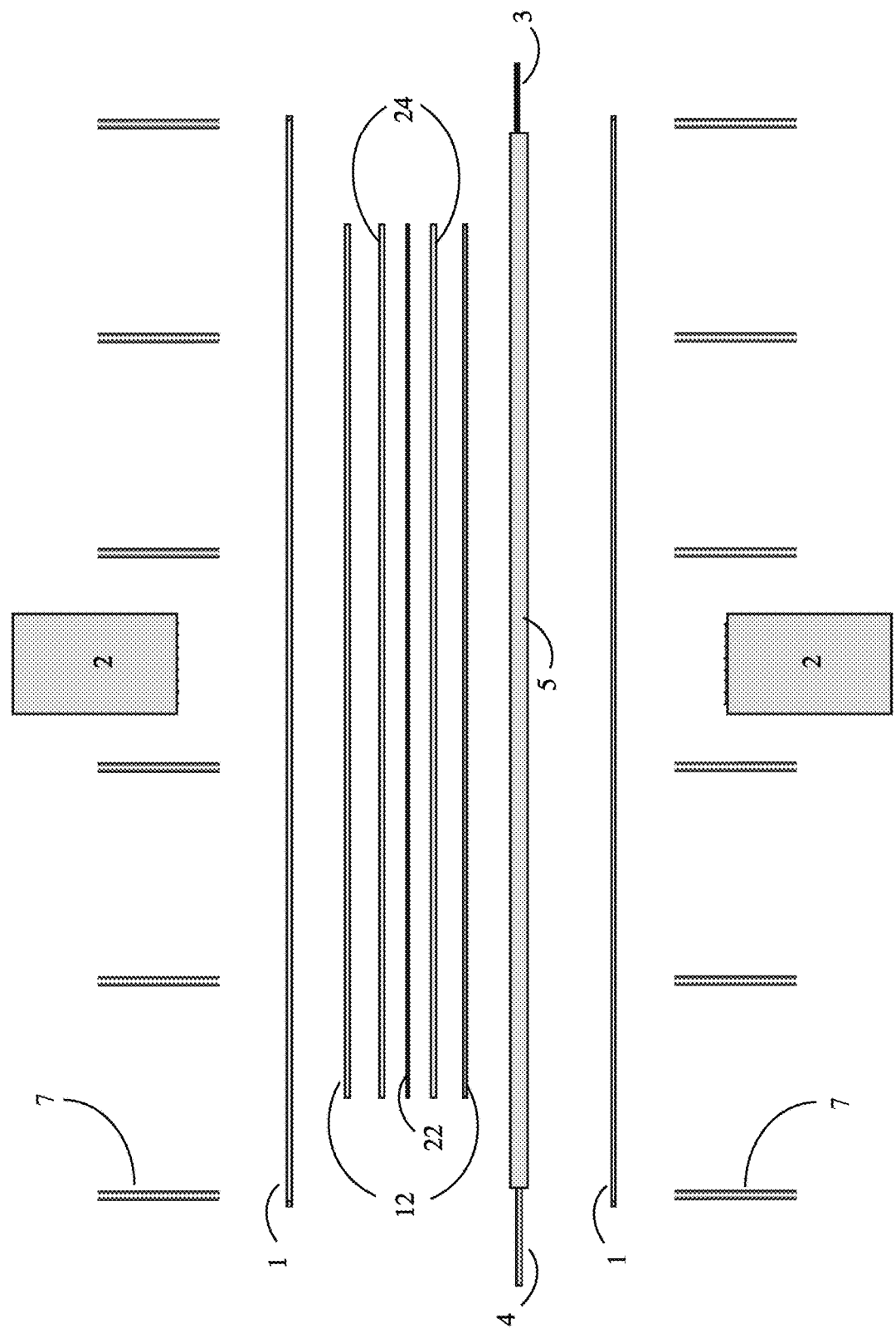
FIG. 4 shows an exploded view of the laminating apparatus and the product components shown in FIG. 3.
Figure 5:
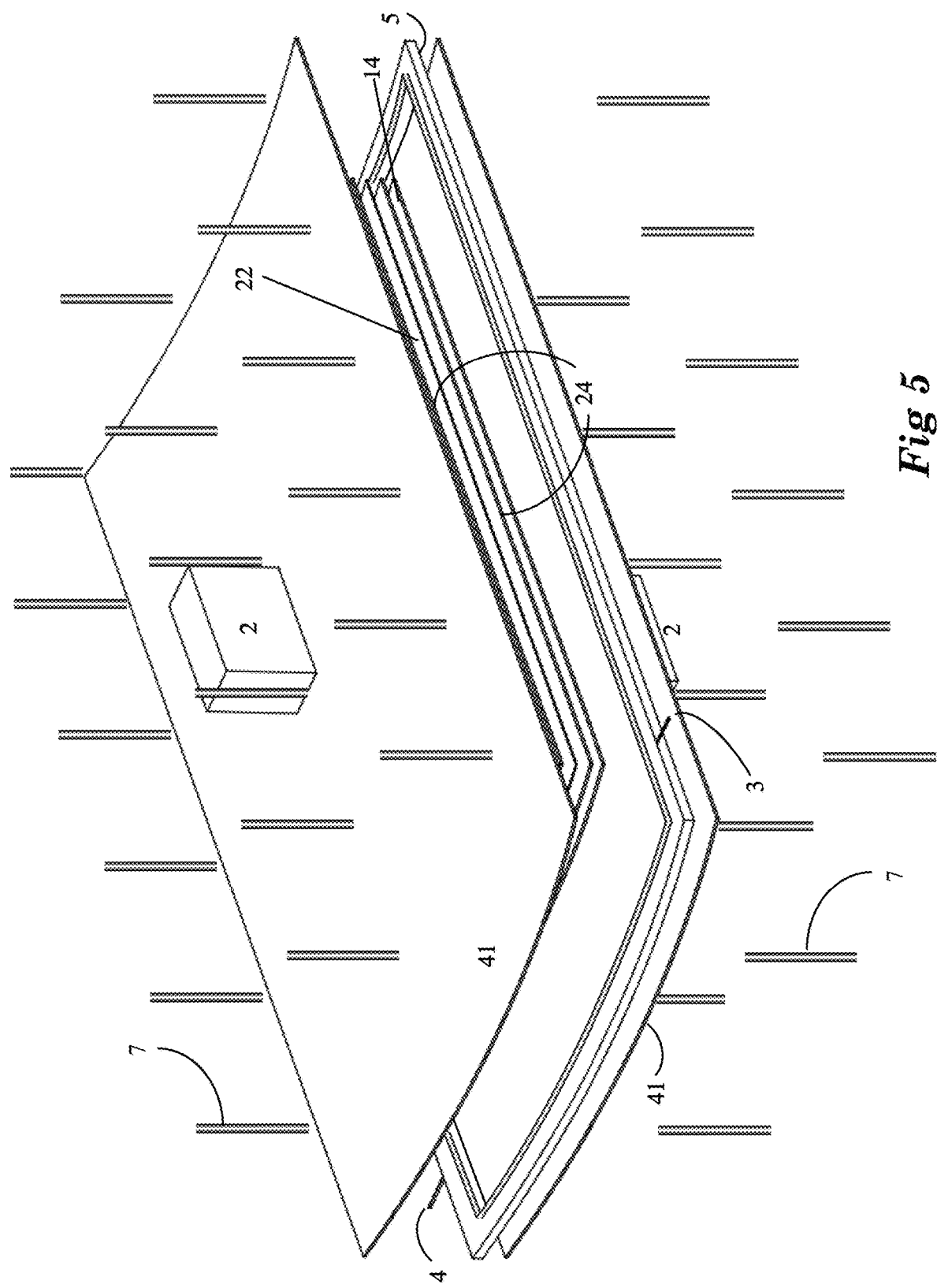
FIG. 5 shows an exploded view of the apparatus and the components of a version of the laminating process as shown in FIG. 3 except that in the embodiment of FIG. 5, some components are curved.
Figure 7A:
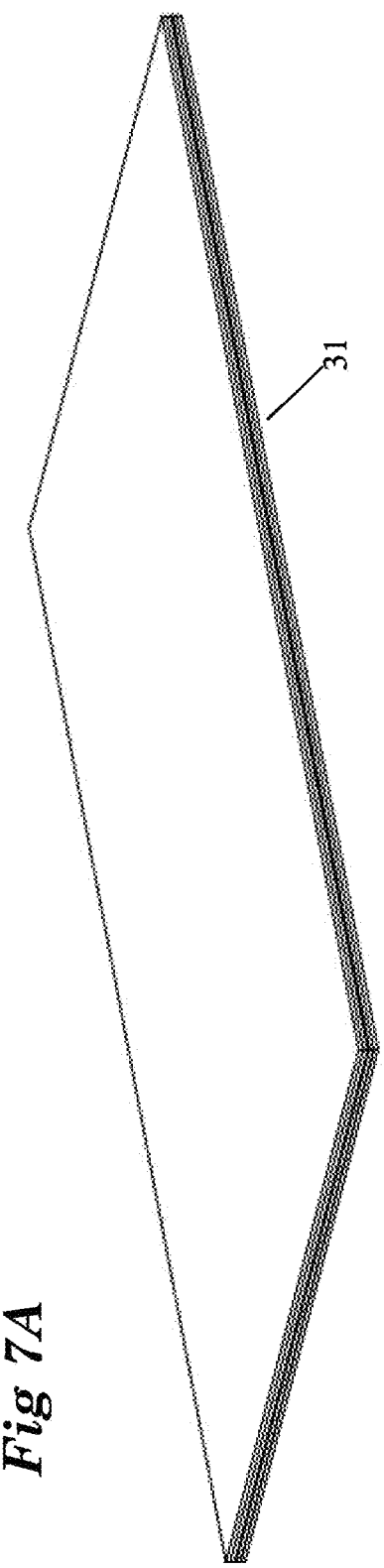
FIG. 7A illustrates a laminating system of glass, cross-linking adhesive layers (binder) and a central layer of film that may be electrochromic or tinted polymer.
Figure 7B:
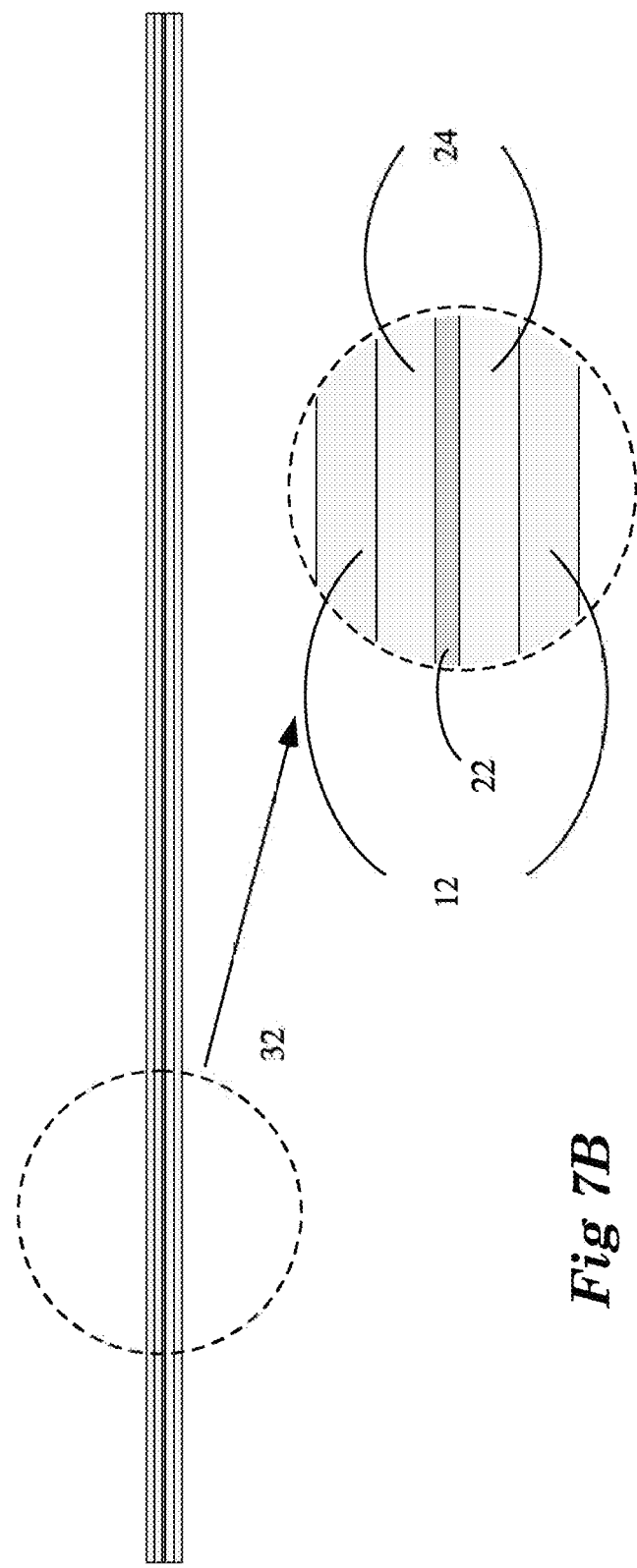
FIG. 7B illustrates a side view of the system with an inset to more clearly show layers within the system.

In an embodiment, an IE&CG system may be used for a glass bending process by modifying the IE&CG system of FIGS. 1 and 2 into a system in which the force of gravity acts on the product glass 14 to bend the glass. The modifications include components for the reshaping of the ceramic glass 1 to the shape of the desired curve or bend of the product glass 14, as seen in FIGS. 5 and 6. For complex curves the ceramic glass 1 can be replaced by a refractory supporting structure 38, which may comprise machined refractory bricks, and a thin sheet of metal as a mold substrate 37 such as Stainless Steel that has been bent to the same curve as desired for the product glass. The metal may be coated with a coating 39 such as boron nitride, titanium nitride, or a similar releasing agent, which can improve both emissivity and thermal conductivity of the stainless steel and prevent sticking. A metal mold substrate 37 may be coated with one or more materials to reduce adhesion, enhance reflection, improve emissivity, etc.

In a glass bending apparatus, a supported curved metal mold structure or a curved ceramic glass mold can be switched out for the lower ceramic glass sheet 1 in an IE&CG system after the product glass 10 has first been heated above the glass transition temperature. This may be most effective if executed in two steps such that the bottom flat ceramic glass 1 is quickly replaced by a shaped-mold system after the product glass 10 is sufficiently heated beyond the glass transition temperature. As gravity pulls the glass against the mold, an infrared emitter 2 may be tuned to transmit through the product glass to heat the stainless steel 37 to beyond the glass transition temperature.

For example, in an embodiment, a sheet of glass 10 is initially heated to its glass transition temperature using a flat ceramic glass sheet 1, and a mold with a shaped substrate 37 is moved into position beneath the glass sheet 10, thereby allowing the glass sheet to conform to the shape of the shaped mold after benefitting from enhanced thermal transfer provided by the flat ceramic glass.

These same technologies also have advantages when employed to reduce the cost and speed up the cycle times for a lamination process of building up layers of glass, either flat or bent, with polymer films between them. The polymer films 22 may include polymers such as polyurethane, polyvinyl butyral, ethylene vinyl acetate (EVA) to produce safety glass. In the automotive industry, such glasses are used for windshields, while tempered glass is typically used for side windows. Embodiments of a system for producing laminated glass assemblies are shown in FIGS. 3-6.

Newer technologies incorporate layers of enhanced polymer films 22 that include electrostatic or even electromagnetic components that can change their physical properties when an electric or a magnetic field is applied to the film such as electrochromic films, producing a highly versatile version of layered product glass 31. Embodiments of a laminate product 31 may be used to create a glass that is laminated with a wide variety of thermoplastic and thermosetting materials as known in the art.

Some films used between layers of glass, whether to form a safety glass or to form a light-conditioning filter such as a sunshade, are laminated in place using a thermosetting resin binder 24 that cross-links or cures after exposure to a specific quantity of thermal energy. Typical maximum temperatures of such curing process are less than 200° F., but can be as high as 450° F. All such temperatures are within the thermal control capabilities of embodiments of an IE&CG system of this disclosure.

An IE&CG system used to produce a glass laminate may operate in a vacuum as well as in atmospheric conditions. As illustrated in FIGS. 3-6, an IE&CG system can be configured to become a vacuum laminating system with the addition of a seal 5, which may be fitted with one or more vacuum ports 4 and temperature sensors 3 and placed around the edges of the float glass-polymer stack. The seal 5 may be an elastomeric polymer material such as silicone, which can maintain a seal while accommodating a reduction in thickness of the adhesive and polymer layers when producing a laminate 31.

The seal 5 is fitted between the top and bottom ceramic glass 1, forming a vacuum chamber including the top and bottom ceramic glass substrates 1 and the seal 5. Trapped inside is the stack of laminate components. Thermal energy is directed to the ceramic glass 1 which heats the product glass 12 by contact and from the top and the bottom which heats the laminating stack by contact conduction. The system may be controlled by monitoring the temperature using temperature sensors 3 while the pressure is reduced through the vacuum ports 4.

The vacuum created within the chamber defined by the seal 5 and upper and lower flat ceramic sheets 1 or curved ceramic sheets 41 may reduce the potential for oxidation or thermal transfer from gas within the chamber and create a pressure differential that compresses the laminate and flows adhesive layers 24, as well as removing voids that can be caused by gasses trapped in or evolved from the layers. In some embodiments, the ceramic substrates 1 or 41 may be compressed by a mechanical force applied by a press, clamp or similar device in addition to or in place of a vacuum.

The process of using the IE&CG system as a laminating system may be used in place of the hand-fitted bagging vacuum glove procedure typically used in the construction of sheet glass laminates common in the glass industry. A glass laminating system of the present disclosure reduces the handling-related costs, improves energy efficiency and significantly improves process speed compared to conventional processes that use a vacuum-bag and an autoclave.

Electromagnetic radiation can interact with glass in at least six distinct ways, including transmission, reflection, retraction, diffraction, absorption and scattering depending on angle of incidence and the material chemistry. Snell's Law describes how the six ways of interaction between the electromagnetic wave and the interacting material can be expressed as the index of refraction. For soda-lime-silica glass the index of refraction is approximately 1.52 which means the speed of an electromagnetic wave is about 1.52 times slower within the material than the electromagnetic wave would propagate in a vacuum. A factor relevant to thermal processing is the fact that the index of refraction for soda-lime-silica glass is nearly flat for wavelengths from ultraviolet through much of the infrared spectrum. For heating product glass using radiant energy, there are concerns with the transmission, reflection and absorption of electromagnetic energy by the glass. Reflection and transmission for a given material are functions of the angle of incidence. Absorption is a function of wavelength and the angle of incidence, since the electromagnetic energy has to enter the glass in order to be either transmitted through the glass or absorbed by the glass.

But what does it mean for the glass to absorb the electromagnetic energy? The electromagnetic energy can directly transfer to or be absorbed by the glass if the energy unit or number of photons matches the energy band gap for an electron in the material. The absorbed energy will cause an electron in orbit to adopt a more energetic orbit or vibration, which means the atom in which the electron is a component increases its frequency and amplitude, which in turn is an increase in molecular thermal motion. Thus the electromagnetic energy absorbed by the electron causes the temperature of the glass to increase.

Figure 10:
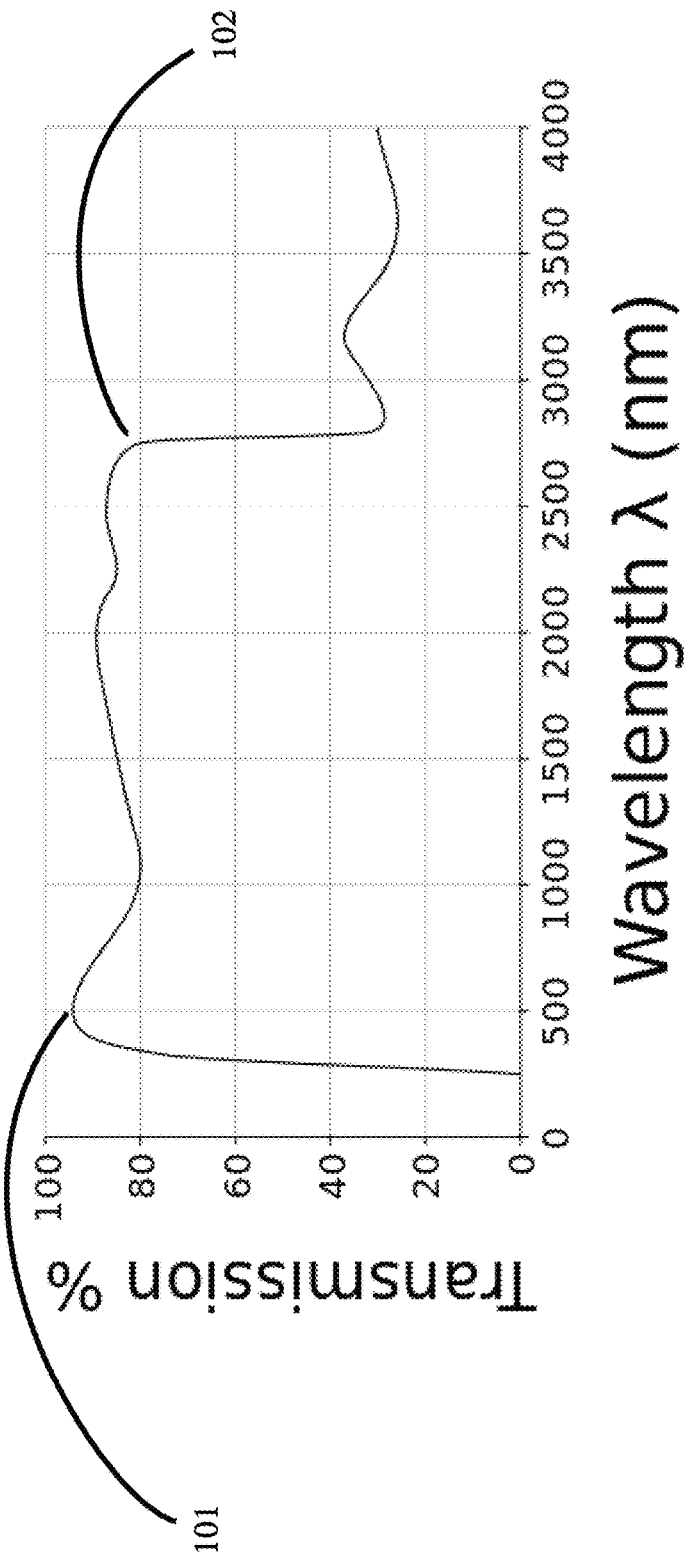
FIG. 10 is a transmission vs. wavelength plot for soda-lime-silica glass.
Figure 11:
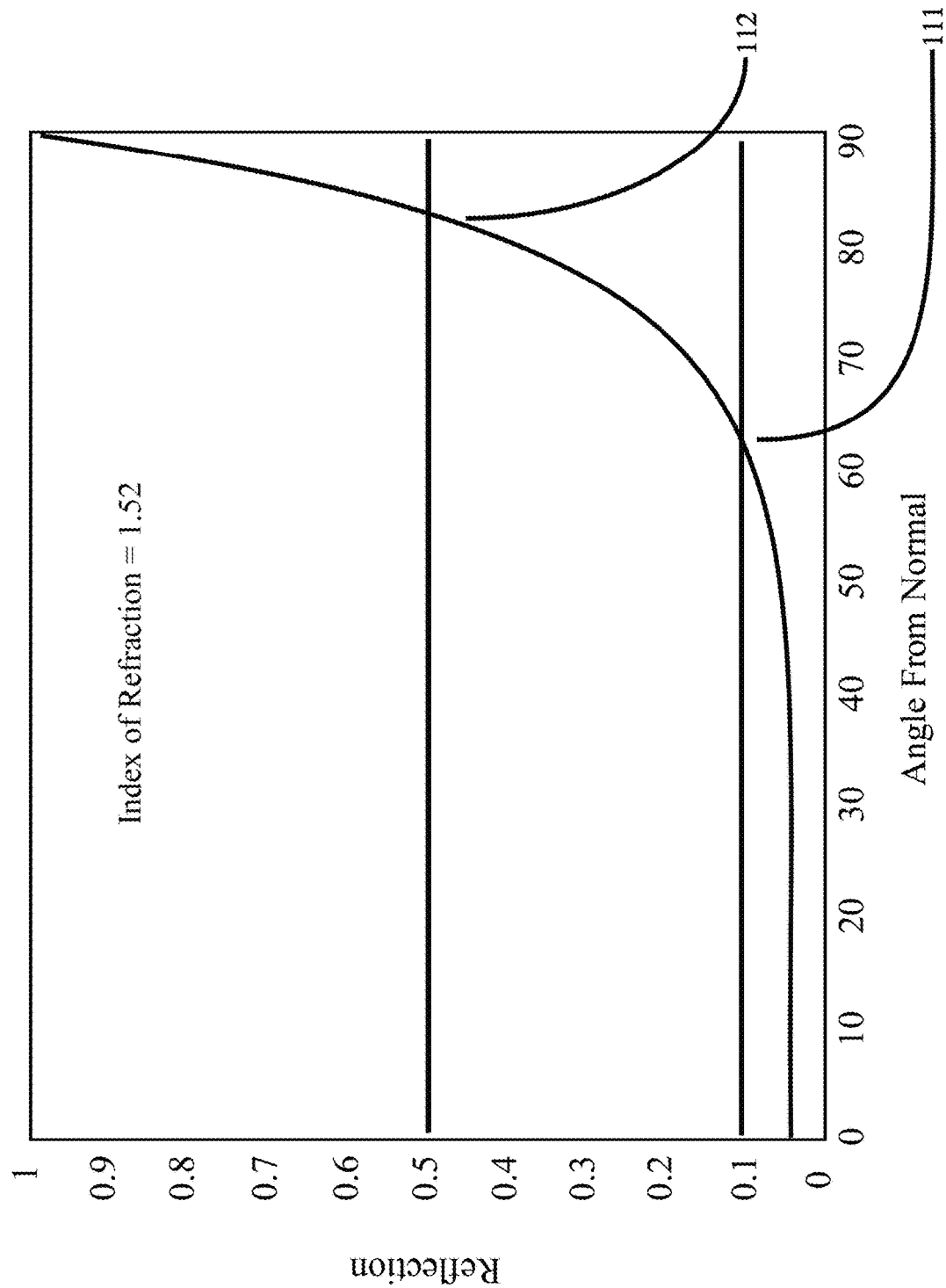
FIG. 11 shows the percent of reflection of unpolarized light relative to angle from normal for a material with an index of refraction of 1.52, as is typical for soda-lime-silica glass.

As can be seen in FIG. 11, for soda-lime-silica glass with a refractive index of about 1.5, the angle of majority transmission (i.e., more than 50% of the incident electromagnetic energy) is greater than 80 degrees from normal as indicated by the steep part of reflection curve 112, and at less than 60 degrees from normal the transmitted energy is more than 90% of the incident electromagnetic energy as indicated by the shallow part of the reflection curve 111. Additionally, because this type of glass is transmissive over most of the radiant spectrum, including UV frequencies 101 and visible light and infrared frequencies 102 illustrated in FIG. 10, the radiant heating of soda-lime-silica glass by radiant emissions from an infrared emitter 2 may be minimal.

In fact, current glass production radiant furnaces project radiant energy that passes through the product glass and the circulating hot air picks up the thermal energy off the walls of the furnace that have been heated by the electromagnetic energy which passed through the product glass and warmed the walls of the furnace. Accordingly, radiant energy transfer from conventional systems that claim to use radiant heat sources is reduced, and most thermal energy in such systems is typically transferred to the glass by convective and conductive transfer through gasses.

This disclosure reveals technology that uses direct conduction to heat the product glass 10 for thermal operations including tempering, bending and laminating. An apparatus of the present disclosure may use a tunable infrared emitter 2 and semi-transmissive ceramic glass 1 to control and rapidly heat an input soda-lime-silica glass or similar glass material to a transformational temperature by optimizing the thermal conduction path.

The direct conduction technology presented may benefit from the use of a tunable infrared emitter 2 to exploit the transmissive and absorptive bands of ceramic glass 1 as a transitional material that will collect and absorb the tuned projected electromagnetic energy and make it available to the input product glass material as a full coverage conductive medium placed in contact with the product glass 10 for the purpose of heating the product glass beyond target thermal transition temperatures.

Figure 8:
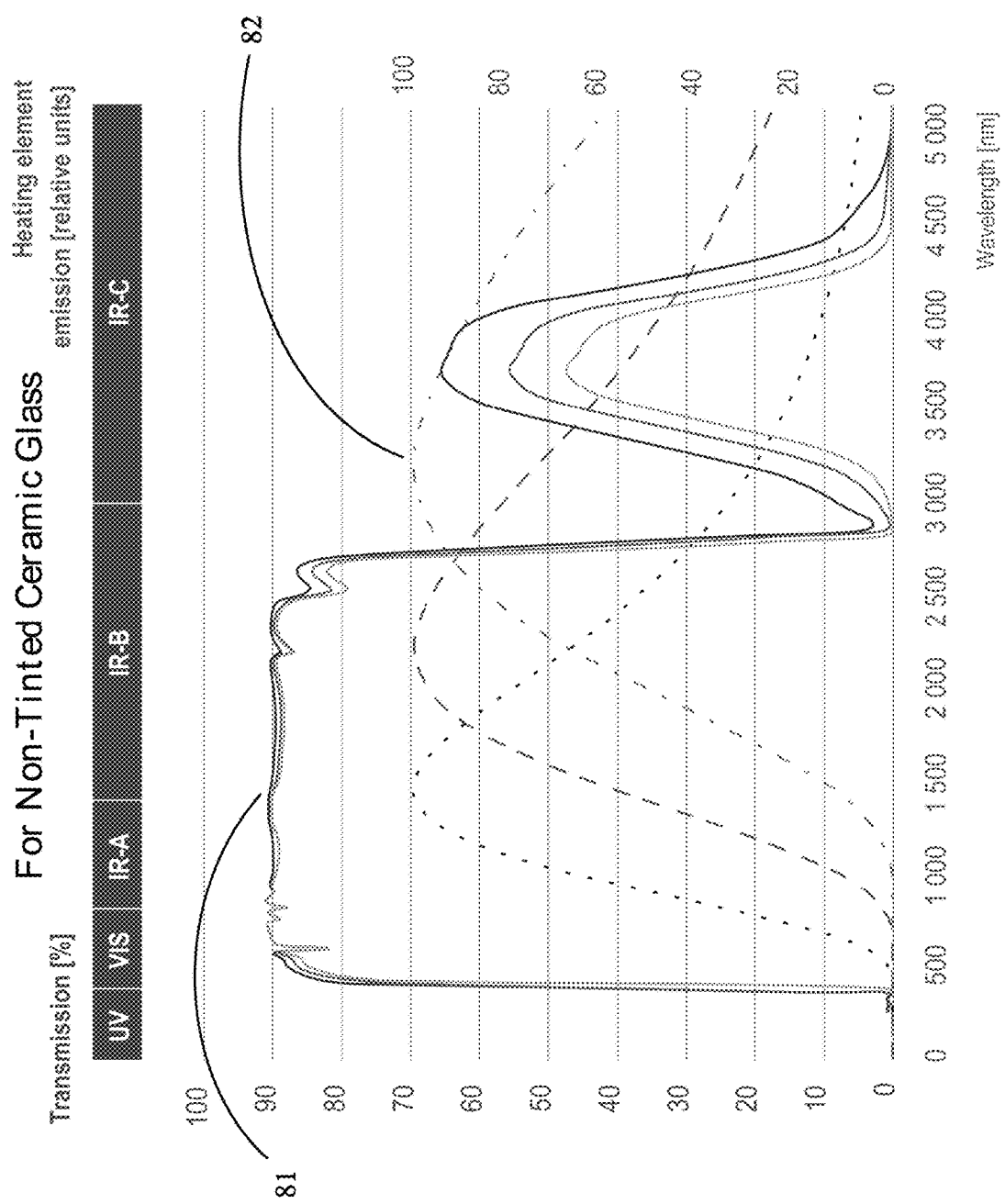
FIG. 8 is a transmission vs. wavelength plot for non-tinted second generation ceramic glasses plotted along with various tuning plots for an infrared emitter.
Figure 9:
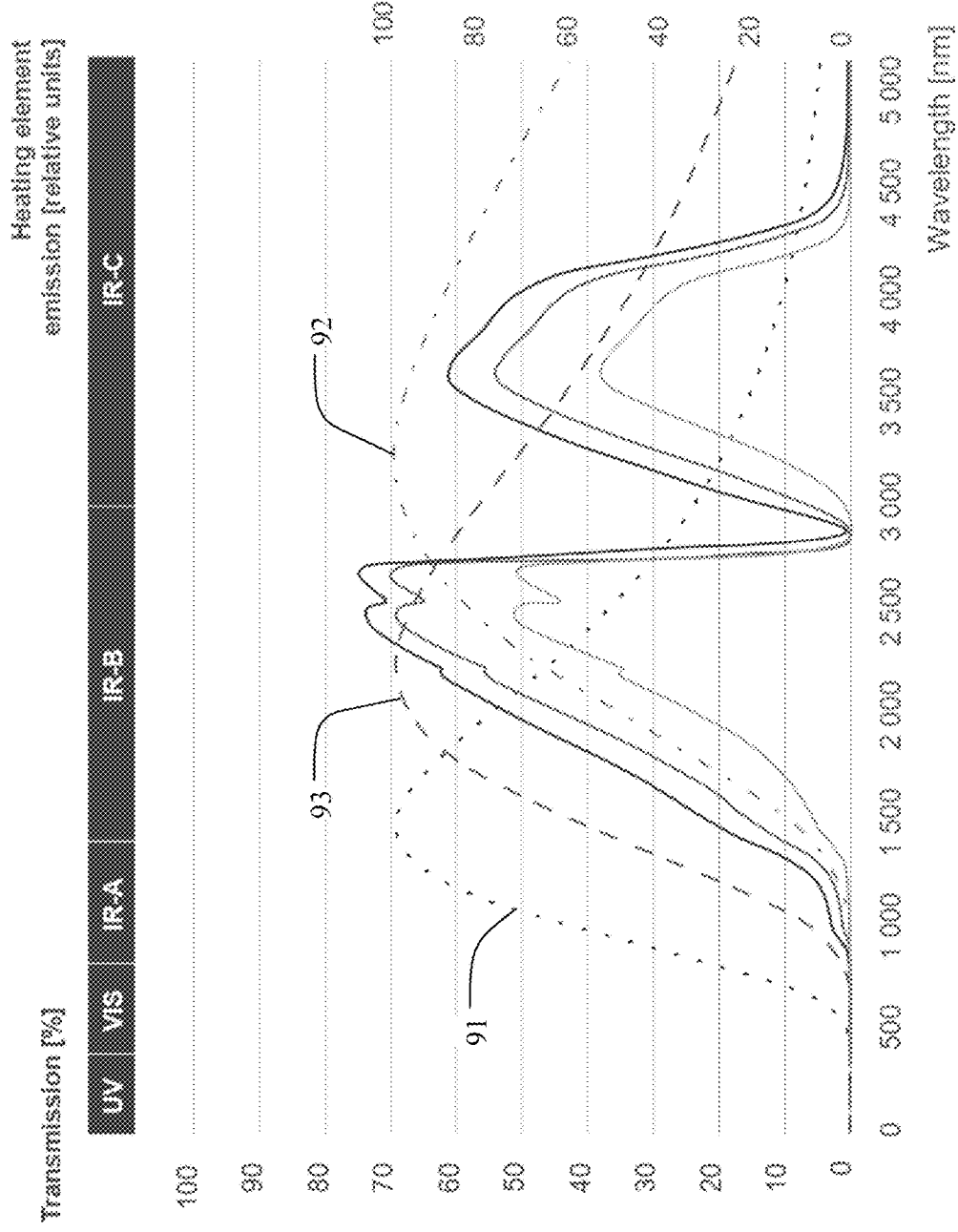
FIG. 9 is a transmission vs. wavelength plot for opaque second-generation ceramic glasses plotted along with various tuning plots for an infrared emitter.

As illustrated in FIGS. 8 and 9, the output bands of a tunable emitter are presented in conjunction with the transmission and absorption bands of examples of ceramic glass 1. It can be seen in these power plots that because the example ceramic glass has two distinct passbands with absorption bands above, between and below the two passbands, there are opportunities to move a tunable infrared emitter 2 to output different center wavelengths and obtain a desired distribution between absorbed and transmitted thermal energy.

The abstracted charts of FIG. 8 and FIG. 9 show that infrared emitter outputs 82 and 92 (low frequency, long wavelength) nominally cover wavelengths from about 2,500 nm to about 3,500 nm. The relationship of wavelength to temperature is given by Wien's Displacement Law:

$$T = \frac{2.898 \times 10^{-3} m \cdot K}{\lambda_{peak}}$$

These lower absorption wavelengths correspond to temperatures of approximately 555° C. to 886° C. (about 1,031° F. to about 1,627° F.). Across this range of wavelengths the absorption of ceramic glass ranges from near 100% to approximately 20%. By centering the tunable infrared emitter to the center of the absorption band at about 3000 nm, the majority of the "energy under the curve" emitted by the infrared source is absorbed by the ceramic glass 1, while enough energy passes through the ceramic glass to ensure that the thermal energy is distributed uniformly throughout the depth of the ceramic glass.

At upper frequencies (higher frequency, shorter wavelength) which are characterized by wavelengths shorter than 2,700 nm and longer than 500 nm, clear ceramic glasses are highly transmissive, while the opaque second generation ceramic glasses are highly absorptive. These shorter wavelengths correspond to temperatures between 1,472° F. and 2,282° F. These temperatures are where the transmission of infrared radiant energy is highly efficient, because the peak source temperature of a tunable infrared emitter 2 may be about 2,250° F., which is much higher than the glass transition temperature of soda lime glass, which may be from 968° F. to 1,112° F.

The efficiency of radiant projection is to the fourth power of the difference in temperature from source to target. Thus, as illustrated in FIG. 2, setting the tunable emitter 2 to high energy emissions 8 will greatly enhance the effective transmission of thermal energy to the ceramic glass 1. Radiant energy 9 that passes through the first ceramic glass substrate 1 and the product glass 10 will penetrate the second ceramic glass substrate backing the other side of the product glass and again will be mostly absorbed. Radiant energy 11 that passes through the second ceramic glass substrate 1 will face the infrared emitter heating the other side of the product glass 10. The high surface temperature of the second radiant emitter 2 will drive the infrared energy 11 back into the ceramic glass 1. The radiant energy will thus be trapped until absorbed by the product glass 10 or lost to the environment because of imperfect thermal isolation of the physical structure of the furnace system. Therefore, in an embodiment, radiant transmitters on a first side of a product glass 10 are positioned to be directly opposed to radiant emitters on a second side of the product glass.

The ability to quickly and controllably heat the ceramic glass 1 is helpful to rapid heating of product glass 10 as an input to heating processes for glass. The ceramic glass 1 additionally provides the ability to physically support the product glass 10 from both the top and the bottom or by the edges while uniformly heating the product glass 10. The ceramic glass substrates 1 may provide support, and in some embodiments, further support is provided by supports 6, which may be ceramic glass, coupled to edges of the product glass 10.

An embodiment of ceramic glass 1 may have more than 100% of its room temperature strength at 800° C. As a result, the ceramic glass 1 has a more than sufficient ability to support the product glass 10 during heating without the issues presented by either steel or ceramic rollers or steel or ceramic hard point edge supports. In an embodiment, a lower ceramic glass substrate 1 may be mechanically supported by a high-temperature material such as a refractory material, which can be substantially thicker than the ceramic glass layer, and therefore can have lower strength characteristics. Example thicknesses of the ceramic glass substrates 1 are from 2 mm to 5 cm, and may vary based on the thickness of the product glass 10 that is being thermally processed. In some embodiments, the thicknesses of the ceramic glass substrates 1 on opposite sides of the product glass 10 are different from each other.

In an embodiment, as illustrated by FIG. 14, a substrate 1 may be a composite material. For example, the substrate may include one or more layer of a first material 16 and one or more layer of a second material 18. The first material 16 may be a ceramic material such as a high temperature ceramic glass, and the second material 18 may be an inorganic material such as a metal, semiconductor or ceramic material. The second material 18 may be a pure metal or semiconductor, an alloy or combination of metal materials, or a carbide, oxide or nitride of a metal or semiconductor material.

In one example, the second material 18 is disposed between two layers of first material 16 that is a ceramic material, and the second material 18 is a layer of metal material such as copper or steel. In such an embodiment, the metal material may absorb infrared frequencies that are minimally or not absorbed by the ceramic material. In this way, the second material 18 can be used to increase the absorption of IR transmissions compared to the first material 16. Accordingly, the second material 18 may be selected along with the first material 16 to provide a desired set of absorption and transmission properties for a substrate 1.

When the second material 18 is in direct contact with the first material 16, IR energy absorbed by the first material 16 may be rapidly and evenly dispersed to the second material 18. Accordingly, the second material 18 may act as a heat spreading material to reduce localized variations in heating from radiant emitters 2 and spread heat evenly across a layer of first material 16, e.g. a ceramic glass material, that is in direct contact with a sheet of product glass 10.

The second material 18 may have a low thickness in the micron range, or a higher thickness on the order of millimeters. A thinner layer of the second material 18 may allow a substantial amount of visible or infrared light to pass, while a thicker layer may absorb larger amounts of energy. In some embodiments, the second material is from 0.1 micron to 5 mm thick, or from 1 micron to 1 mm thick. Although thinner layers are possible, the effects of the layer may be diminished at angstrom-scale thicknesses.

While the embodiment in FIG. 14 shows a single layer of second material 18 sandwiched between two layers of first material 16, in other embodiments, a composite substrate has only one layer of first material and one layer of second material, two layers of second material and three layers of first material, etc. Each layer of first material 16 and second material 18 may be different from the other layers to obtain desired properties. For example, two layers of the first material 16 may be different types of ceramic material that have different individual absorption characteristics that interact with one another to provide desired/combined absorption characteristics.

In some embodiments, a substrate 1 comprises multiple sheets of material that are arranged side-by-side. Such an arrangement may be used, for example, when treating large sheets of product glass 10. When a substrate 1 comprises multiple sheets of material arranged on the same plane, the sheets of material may be coupled to one another by joints such as dovetail joints, ship lapped joints, or other types of joints that join multiple individual small sheets of material into a single, larger substrate sheet 1.

A technique of rapidly and uniformly heating the product glass 10 may use the distribution of the radiant energy from the tunable emitter 2, from the outer surface to the inner surface of the ceramic glass 1. This distribution of radiant energy along the transmissive/absorptive path through the ceramic glass can enable an extremely rapid heating of a ceramic glass even when the ceramic glass has a relatively low thermal conductivity. A heating apparatus in which ceramic glass 1 is disposed between an infrared emitter 2 and the product glass 10 to be heated and in which heat is transferred from a heated sheet of ceramic glass to the product glass 10 by conduction using direct contact presents a unique glass heating process.

The ceramic glass 1 acts to receive and even out the radiant energy from the tunable radiant emitter 2 and to supply thermal energy at a relatively high rate using a high differential temperature until the product glass 10 approaches the target temperature, at which point the ceramic glass 1 may be pulled away from the target glass 10. In an embodiment, temperature is monitored by a temperature sensor 3 to ensure that the glass achieves a target temperature.

Because a low CTE enables ceramic glass to absorb extreme thermal shock without damage, more rapid thermal energy removal than in a conventional process is possible. As such, the cooling jets 7 can provide rapid cooling when dispensing a relatively low density gas such as nitrogen or air. In an embodiment, higher rates of thermal energy removal can be realized when heavy organic substances such as R-245fa or similar high molecular weight substances are applied to the ceramic glass 1 through the cooling jets 7 with their large latent thermal energy capture capability.

Additionally, the extremely low thermal conductivity of ceramic glass and the non-porous, non-reactive surface makes the ceramic glass a highly effective physical support system to support the product glass using a separate support structure 6 isolated from the ceramic glass 1 used for heating the product glass. To provide a supportive interface, the edge of the product glass 10 may be formed to have a shape that interfaces with a support 6. For example, as seen in the embodiment shown in FIG. 2, the edge of the product glass may be ground and polished to have three constant-radius curves as an interface 36 which form a support groove into which the support 6 fits with a matching, reversed form supporting structure, although other shapes for the support interface are possible.

When the product glass 10 is subjected to high temperature processes such as tempering and bending, the support 6 may comprise a high-temperature ceramic glass material that may be the same as or similar to the ceramic glass material used for the ceramic glass sheets 1. If a CTE difference is present between a material of the support 6 and the product glass 10, the shape of the interface 36 may be designed to accommodate that difference—for example, by ensuring that no material enlarges to the point at which interference between the glass and ceramic materials causes one of the materials to break.

In an embodiment of a system for making glass laminates, the infrared emitters 2 may be tuned to output wavelengths 93 at which most radiant energy is absorbed by the ceramic glass. The polymer cross-linking binders 24 are sensitive to over-temperature. By limiting the energy transmitted through the ceramic glass 1, the conductive heating of the product glass 10 is the primary thermal transport system operating to raise the cross-linking polymers to their cross-linking temperature, which may be, for example, about 90° C. Constant temperature monitoring of the product glass 10 by a temperature sensor 3 in conjunction with control of the amount of energy emitted by the radiant emitters 2 facilitates precise energy delivery. The ability to quickly remove contact between the ceramic glass 1 and the product glass 10, which can instantly eliminate the addition of thermal energy to the laminating process, can prevent adhesive layers from experiencing excessive temperatures.

Figure 13:
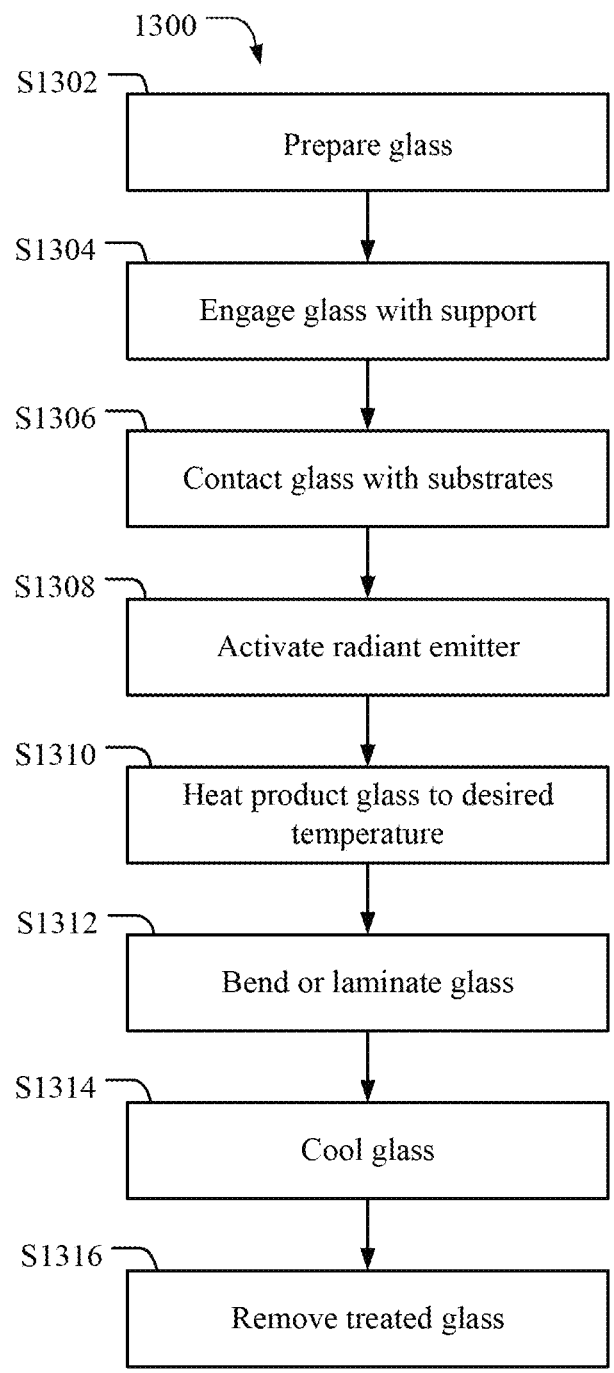
FIG. 13 illustrates an embodiment of a process for heat treating product glass.

An embodiment of a process 1300 of thermal treatment of glass will now be explained with respect to FIG. 13. Embodiments of the process 1300 may be adapted to perform a variety of thermal treatments including tempering, bending, and laminating sheets of glass. Although the process 1300 is discussed with respect to the specific embodiments illustrated by the figures, those embodiments are used for purposes of explanation and illustration. In some embodiments, steps of process 1300 may be omitted or performed in a different order from the sequence shown in FIG. 13.

Before being loaded into a treatment apparatus, a glass sheet 10 may be prepared at S1302. Preparation of a glass sheet 10 may include cleaning the glass to remove any particles that could prevent direct physical contact between the product glass 10 and a ceramic glass sheet 1. In some embodiments, the product glass 10 is protected from exposure to potential contamination, for example by stacking cast glass sheets directly against one another soon after casting, which could minimize the chance of being exposed to contamination. Cleaning may be performed by various substances and processes as known in the art.

Preparing the glass sheet 10 at S1302 may further comprise forming a shape on edges of the glass sheet. The shape may be an interface 36 for a support 6 that is used to physically support a sheet of glass 10 as it is being loaded into and out of a heat treatment assembly, or to retain a sheet of heated glass when a support structure 38 for bending the glass is placed under the heated glass. As seen in FIG. 2, the edges of the glass 10 may be formed to have an interface 36 with a shape that is a mirror image of a shape that is present in the support 6. The shape may orient the support 6 with respect to the glass 10 so that, for example, the support does not extend above or below the glass, which could interfere with a physical interface with ceramic sheets 1, and to provide sufficient surface area to support the glass against the force of gravity.

In an embodiment, the shapes of an interface 36 are formed by grinding and polishing the edges of a sheet of product glass 10. The primary surfaces of the glass 10 may be covered during grinding and polishing operations to minimize the chance of contaminating the surfaces.

The product glass 10 is engaged with a support 6 at S1304. In one example, as seen in FIG. 1, the support 6 includes four separate structures that are oriented symmetrically on two ends of a glass sheet. Each of the support structures 6 has two holes 40, which may be used to retain the support elements to a positioning system (not shown). For example, ceramic or metal rods or pin may be inserted into holes 40 in one or both of the frame 21 and support structures 6, and those pins may in turn be coupled to two sheets of a metal or ceramic material that are clamped to opposite sides of the frame or supports.

The positioning system may be used to apply force to a support 6 to hold the glass sheet 10 in place, to load or unload the glass sheet into a heat treatment apparatus, and to move a glass sheet between different physical locations in general. Although the support 6 in FIG. 1 has four pieces that are disposed symmetrically on two edges of a glass sheet 10, in another embodiment, the support 6 may have only one element on each of two opposing ends of the glass sheet, or more than two elements. In some embodiments, elements of support 6 are disposed against all four edges of a rectilinear sheet of glass 10.

The product glass 10 is brought into contact with IR-absorptive ceramic glass substrates 1 at S1306. Contacting the glass with substrate materials may comprise bringing at least one substrate into direct physical contact with a surface of a product glass sheet 10. In an embodiment, ceramic glass substrates 1 are coupled to a frame 21 with a plurality of mounting holes 40 or similar geometric features that mechanically couple the ceramic substrate to a loading/unloading apparatus through the frame. Grasping and handling the frames 21 can reduce the chance that the ceramic sheet 1 is contaminated or damaged.

When process 1300 is a laminating process, a seal 5 may be applied to the substrate/glass assembly after the substrates are brought into contact with the product glass. The seal may include a continuous elastomeric member that extends around the entire perimeter of the substrate/glass stack to prevent air from leaking into a space between the substrates. The material and precise shape of the seal 5 are not particularly limited, but should be sufficient to maintain a seal under a vacuum of 100 Torr or less, or 1 Torr or less, and have thermal properties that are sufficient to withstand being heated to operating temperatures.

The substrate materials may be high-temperature IR absorptive ceramic glass sheets 1. In some embodiments, one or both of the substrates may comprise a ceramic or metal material that is coated for one or more of preventing adhesion, chemical resistance, enhancing thermal transfer, and absorbing IR radiation. Contacting the glass with substrates may comprise lifting a sheet of product glass 10 by a support 6 into a heat treatment apparatus or system that comprises radiant emitters 2, ceramic glass sheets 1 as substrates, and additional physical structures that mechanically support the ceramic glass sheets and radiant emitters.

For higher temperature operations, the lower substrate may be a ceramic glass sheet 1 that is supported by a refractory material. Similarly, the upper substrate may be a ceramic glass sheet 1 that is retained by a suspended refractory structure that can be lowered into place as described in U.S. application Ser. No. 17/347,428. In another embodiment, edges of the upper substrate may be placed in slots of a refractory material, and the refractory material may be lowered into place over the glass sheet so that the upper substrate rests on the glass sheet 10. In one embodiment, the upper structure that retains the upper substrate material is a hinged lid that can be opened and closed to lower a ceramic substrate 1 onto product glass 10. In still another embodiment, a sheet of product glass 10 is placed on a lower substrate material without using a support 6.

One or more radiant emitter 2 may be activated at S1308. The radiant emitter 2 may be tuned to emit frequencies that are absorbed by a ceramic substrate 1 that is in contact with a glass sheet 10. As seen in FIG. 8 and FIG. 9, different types of ceramic glass have different transmission and absorption characteristics. For example, the non-tinted ceramic glasses of FIG. 8 have a large passband 81 that passes over 80% of light in the visible range and up to about 2800 nm, absorb over 90% of light around the 3000 nm wavelength, and have a second transmission peak centered around 3750 nm. Accordingly, if the ceramic glasses shown in FIG. 8 are used in process 1300, the infrared emitters 2 may be tuned to output curve 82, since the ceramic glasses of FIG. 8 absorb more of the energy associated with output curve 82 than the other emitter outputs shown in the figure.

Similarly, FIG. 9 illustrates transmission characteristics of several different opaque ceramic glasses 1. The ceramics have two transmission peaks at about 2500 and 3500 nm. Here, IR emitter output 91 has a peak at 1500 nm, and a substantial majority of the IR output of that curve is absorbed by the ceramics. In contrast, the peak of the middle IR output 93 is relatively close to the lower wavelength transmission band of the ceramic glass, so less IR energy would be absorbed by the ceramic glass for IR output 93 than IR output 91. The peak of emission curve 92 of around 3250 nm is located between the two transmission peaks of the glass, and a majority of the IR energy would be absorbed by the ceramic glass if emitters 2 are tuned to output according to curve 92. In addition, as seen in FIG. 10, soda-lime glass passes more than 80% of IR wavelengths below about 2700 nm. Accordingly, emitter output curve 91 would result in higher absorbance by the ceramic material 1, and the IR energy that passes through the ceramic by output 91 mostly passes through the product glass, so that a substantial majority of the heating of the product glass is provided by the ceramic material through conduction or physical contact.

In an embodiment, the IR emitters 2 are tuned and/or a ceramic material is selected so that more than 50%, 60%, 70%, 80% or 90% of the IR energy emitted is absorbed by one or more ceramic substrate 1 that is in physical contact with a sheet of product glass 10. In various embodiments, depending on the type of thermal process and the absorptive properties of a substrate material and a product glass, IR emitters 2 may be tuned to have a peak output that is between 1000 and 2000 nm, between 1500 and 2500 nm, between 2000 and 3000 nm, between 2500 and 3500 nm, or between 3000 and 4000 nm.

The sheet of product glass 10 is heated to a desired temperature at S1310. In an embodiment, the primary source of heat for the product glass 10 is one or more substrate 1 that is in contact with the product glass 10. In embodiments, the product glass absorbs less than 50%, less than 40%, less than 30%, less than 20%, less than 10% or less than 5% of the IR radiation emitted by the emitters 2. Instead, the majority of IR radiation from the emitters 2 is absorbed by substrates 1, and the product glass is heated by conduction and radiation from the heated substrates 1.

Accordingly, heating the product glass 10 at S1310 may comprise irradiating one or more substrate 1 in contact with the product glass, and transferring heat from the substrate to the product glass, wherein a majority of the heat used to heat the product glass is transferred from the one or more substrate.

The product glass 10 may be stationary throughout the heating process. In particular, the product glass 10 may remain in contact with at least one substrate 1 in a static configuration while the glass is heated at S1310. In an embodiment of the present disclosure, a sheet of product glass 10 is not moved across rollers or a similar conveyance system while it is heated.

When process 1300 is a tempering process, the glass may be heated to a temperature of 1,148° F. or greater. When the process is a bending process, the glass may be heated to a temperature of 1,166° F. or greater. When the process is a lamination process, the glass may be heated to a temperature of 150° F. or greater, 200° F. or greater, or 300° F. or greater. A ceramic glass substrate 1 may be heated to a temperature that is higher than a temperature of the product glass 10 so that the temperature of the ceramic substrate is from 20 to 600° F. greater than the temperature of the product glass.

A temperature sensor 3 may be used to ensure that the sheet of glass 10 reaches a desired temperature. However, in another embodiment, a temperature sensor 3 may not be used after a reliable process has been developed—instead, process conditions may be monitored to ensure that a predetermined amount of energy is delivered by the infrared emitters 2 for a predetermined amount of time.

When process 1300 is a bending or lamination process, a sheet of glass may be bent or laminated at S1312. In a lamination process, the laminating may be performed by flowing a polymer material by one or more of maintaining a predetermined temperature for a predetermined time, maintaining a negative (vacuum) pressure between two substrates, and applying pressure to a laminate assembly. The vacuum pressure may be applied to a laminate assembly through a vacuum port 4 disposed in a seal 5.

A vacuum pressure within the sealed enclosure creates a pressure differential between the atmosphere outside the assembly and space within the assembly, which may cause substrates on sides of the glass sheet 10 to press the laminate materials together. In addition, the vacuum may expel atmospheric and evolved gases and remove oxygen to prevent oxidation of laminate materials. In an embodiment, external pressure may be applied to one or more of the substrates by a clamp or press to press the laminate assembly together.

When process 1300 is a bending process, the glass sheet may be placed into contact with an object that is shaped with the desired bend at S1312. Bending the glass can be accomplished in several different ways.

In one embodiment, a sheet of product glass 10 is heated between two flat sheets of ceramic substrate 1 as seen in FIG. 1 and FIG. 2, and the product glass is coupled to supports 6. After reaching a desired temperature at S1310, which may be above the softening point of the glass, one or both of the ceramic substrates 1 may be replaced with a metal or ceramic substrate 37 that has the desired shape. In such an embodiment, the glass may be grasped by the supports 6 and transported to a location between the shaped ceramic substrates to produce a shaped sheet of glass 14.

Figure 12:
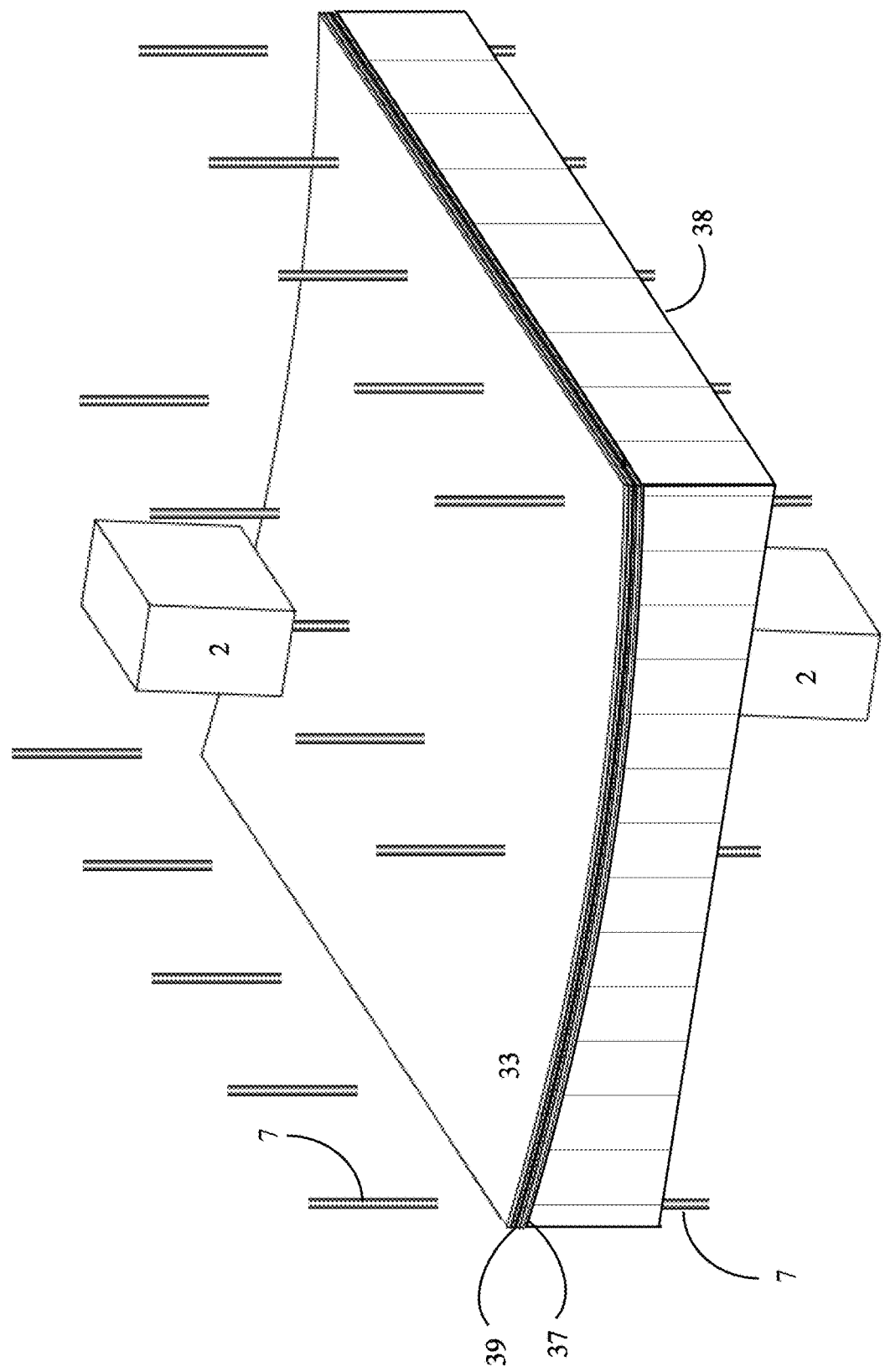
FIG. 12 shows a sheet of product glass being bent by placement on a mold supported by insulating refractory bricks.

In an embodiment, as seen in FIG. 12, a sheet of heated glass may be positioned over a support structure 38 to form a sheet of shaped glass 33. Although FIG. 12 shows a support structure 38 with a concave shape, in another embodiment, the support structure has a convex shape.

A sheet of heated product glass 10 may be held in place while at least one ceramic substrate 1 that is placed against the product glass in the heating phase is replaced with a shaped substrate. In another embodiment, the heated product glass 10 may be moved into position between two stationary shaped substrates. In one embodiment, a heated glass sheet 10 is held in place by supports 6 while a flat lower ceramic glass substrate 1 is replaced with a shaped substrate. The supports 6 may be removed after a shaped substrate is in position so that the glass bends by the force of gravity. In another embodiment, the glass 10 is retained by the supports 6 throughout the bending process. When a flat upper ceramic substrate 1 is retained in contact with a sheet of product glass 10 and a lower ceramic substrate is replaced with a shaped substrate, the infrared emitters 2 above the ceramic sheet 1 may remain in operation and continue to provide heat to the product glass while the lower substrate is being replaced.

In an embodiment, the infrared emitters 2 may be re-tuned at S1312 to emit more IR radiation that are absorbed by the product glass 10 when one of the substrates 1 is removed from contact with the product glass 10. In other words, when the product glass 10 is in contact with two substrates 1, the substrates absorb most of the IR emissions, and supply most of the heat used to heat the product glass. When one or more of the substrates is moved out of contact with the product glass 10, the glass may cool rapidly. To reduce the extent to which the temperature of the product glass 10 decreases after being separated from one or more substrate 1, an emitter 2 that is directed towards the product glass may be re-tuned to output frequencies that are absorbed by the product glass at a higher amount than frequencies that were used to heat a ceramic substrate 1.

A support structure 38 may comprise a lower support part formed of refractory material, such as blocks of shaped refractory ceramic. The upper surface of the support structure may comprise a substrate layer 37 of ceramic or metal material that has a predetermined shape. Substrate layer 37 may be coated with a coating 39 that prevents adhesion between product glass and the substrate layer, such as boron nitride. In an embodiment, the substrate material 37 is heated to an elevated temperature before being brought into contact with the sheet of glass.

Next, the sheet of heated product glass 10 or 14 is cooled at S1314. When the product glass is being tempered, the glass may be cooled rapidly to form a sheet of tempered glass 12. In an embodiment, the glass 10 may be cooled by exposing a substrate to a stream of fluid that may be a gas or liquid from one or more cooling jet 7. The gas may be air, an inert gas, or a thermal transfer gas that is heavier than air. Cooling jets 7 may be configured to provide enough fluid to remove heat from substrates in contact with a glass sheet to obtain a desired cooling rate.

When the lower substrate is a support structure 38, the cooling jets 7 may be coupled to the support structure and directed to the substrate layer 37. In addition to or instead of cooling jets 7, the support structure 38 and/or the substrate may have one or more fluid channel that is configured to convey a liquid through the support structure and/or substrate to cool the substrate layer 37 at a controlled rate. In an embodiment, product glass 10 is rapidly cooled after being bent to temper the bent glass 14.

In some embodiments, a cooling jet 7 may deliver a liquid material to a substrate. Since high temperature ceramic materials may have a high tolerance for thermal shock as discussed above, it is possible to expose a ceramic substrate to room-temperature water at 1,508° F. without cracking. Accordingly, in an embodiment, a ceramic substrate 1 may be cooled with liquid water or a heavier organic fluid while remaining in contact with a sheet of product glass to cool the product glass. The ceramic substrate 1 may be cooled by both gas and liquid—for example, a substrate may be initially cooled with a gas until it reaches a predetermined temperature, and remaining heat may be removed by exposing the substrate to a liquid.

The liquid may be heated to an elevated temperature to reduce the amount of thermal shock experienced by a substrate. In such an embodiment, the liquid may comprise a material with a higher boiling point than water, such as propylene glycol, ethylene glycol or diethylene glycol, so that the liquid can be heated to a higher temperature than the boiling point of water before the substrate is exposed to the liquid.

In another embodiment, a substrate that is in contact with product glass 10 can be brought into contact with a solid material that is used to sink heat from the substrate. For example, infrared emitters 2 may be moved out of position with respect to the product glass 10 and a solid heat sink structure may be moved into position above and/or below the product glass. The temperature of such a heat sink structure may be controlled to reduce thermal shock. In addition, a solid heat sink structure may have one or more channel through which liquid flows to remove heat from the heat sink.

After it is cooled, a sheet of treated glass 12, 14 or 31 is removed from a heat treatment assembly at S1316. The treated glass may be removed automatically by a mechanical apparatus coupled to supports 6, or lifted by a vacuum system or by hand after the glass has reached a sufficiently low temperature to be handled.

The invention claimed is:

1. A method for preparing a glass laminate, the method comprising:
bringing a first side of an unbonded glass laminate into contact with a first ceramic glass substrate, the unbonded glass laminate including at least one material layer disposed between two sheets of glass;
bringing a second side of the unbonded glass laminate into contact with a second ceramic glass substrate, wherein edges of the unbonded glass laminate are inward of edges of the first and second ceramic glass substrates;
applying a seal around the unbonded glass laminate to create a sealed area;
drawing a vacuum within the sealed area;
irradiating the first ceramic glass substrate with infrared energy by a first infrared emitter to bond the glass laminate;
releasing the vacuum; and
separating the bonded glass laminate from the first ceramic glass substrate,
wherein the sealed area is bounded by the first and second ceramic glass substrates and an elastomeric seal that extends around a perimeter of the first and second ceramic glass substrates.

2. The method of claim 1, the method further comprising:
irradiating the second ceramic glass substrate with infrared energy by a second infrared emitter.

3. The method of claim 2, wherein more than 80% of infrared energy emitted by the first and second infrared emitters is absorbed by the first and second ceramic glass substrates.

4. The method of claim 1, wherein the vacuum is drawn through a vacuum port disposed in the elastomeric seal.

5. The method of claim 1, wherein the irradiating heats the first ceramic glass substrate to a temperature that is higher than a temperature of the sheet of glass contacting the first ceramic glass substrate.

6. The method of claim 1, wherein the at least one material layer includes a polymeric material layer disposed between two adhesive layers.

7. The method of claim 1, wherein the at least one material layer includes at least one of a tinted polymeric layer and an electrochromic layer.

8. The method of claim 1, wherein irradiating the first ceramic glass substrate heats the uncured glass laminate to a temperature of 450° F. or less.

9. The method of claim 1, wherein bringing the first side of the unbonded glass laminate into contact with the first ceramic glass substrate comprises grasping a frame coupled to the first ceramic glass substrate and lowering the first ceramic glass substrate by the frame onto the unbonded glass laminate.

10. The method of claim 1, further comprising:
applying a force to compress the first glass laminate when the glass laminate is being bonded.

11. A method for preparing a glass laminate, the method comprising:
bringing a first side of an unbonded glass laminate into contact with a first ceramic glass substrate, the unbonded glass laminate including at least one material layer disposed between two sheets of glass;
bringing a second side of the unbonded glass laminate into contact with a second ceramic glass substrate, wherein edges of the unbonded glass laminate are inward of edges of the first and second ceramic glass substrates;
applying a seal around the unbonded glass laminate and the first and second ceramic glass substrates to create a sealed area;
evacuating air from within the sealed area;
irradiating the first ceramic glass substrate with infrared energy by a first infrared emitter and irradiating the second ceramic glass substrate with infrared energy by a second infrared emitter to bond the glass laminate;
releasing the vacuum; and
separating the bonded glass laminate from the first and second ceramic glass substrates,
wherein the sealed area is bounded by the first and second ceramic glass substrates and an elastomeric seal that extends around edges of the first and second ceramic glass substrates.

12. The method of claim 11, wherein more than 80% of infrared energy emitted by the first and second infrared emitters is absorbed by the first and second ceramic glass substrates.

13. The method of claim 11, wherein the irradiating heats the first ceramic glass substrate to a temperature that is higher than a temperature of the sheet of glass contacting the first ceramic glass substrate.

14. The method of claim 11, wherein irradiating the first and second ceramic glass substrates heats the uncured glass laminate to a temperature of 450° F. or less, and the at least one material layer includes at least one of a polymeric layer, a tinted layer and an electrochromic layer.

15. The method of claim 11, wherein bringing the first side of the unbonded glass laminate into contact with the first ceramic glass substrate comprises grasping a frame coupled to the first ceramic glass substrate and lowering the first ceramic glass substrate by the frame onto the unbonded glass laminate.

* * * * *